United States Patent
Cui et al.

(10) Patent No.: US 11,356,349 B2
(45) Date of Patent: Jun. 7, 2022

(54) ADAPTIVE RESOURCE ALLOCATION TO FACILITATE DEVICE MOBILITY AND MANAGEMENT OF UNCERTAINTY IN COMMUNICATIONS

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Sangar Dowlatkhah, Cedar Hill, TX (US); Nigel Bradley, Canton, GA (US); Ari Craine, Marietta, GA (US); Robert Koch, Peachtree Corners, GA (US)

(73) Assignees: AT&T INTELLECTUAL PROPERTY I, L.P., Atlanta, GA (US); AT&T MOBILITY II LLC, Atlanta, GA (US)

(*) Notice: Subject to any disclaimer, the term of this patent is extended or adjusted under 35 U.S.C. 154(b) by 133 days.

(21) Appl. No.: 16/931,644

(22) Filed: Jul. 17, 2020

(65) Prior Publication Data

US 2022/0021597 A1    Jan. 20, 2022

(51) Int. Cl.
*H04L 43/0876* (2022.01)
*H04L 43/16* (2022.01)
(Continued)

(52) U.S. Cl.
CPC .......... *H04L 43/0876* (2013.01); *H04L 12/14* (2013.01); *H04L 43/16* (2013.01);
(Continued)

(58) Field of Classification Search
CPC ..... H04L 43/0876; H04L 12/14; H04L 43/16; H04L 47/70; H04W 4/50; H04W 4/24; H04M 15/58; H04M 15/80
(Continued)

(56) References Cited

U.S. PATENT DOCUMENTS 6,302,007 B1    10/2001  Tobler et al.
6,384,740 B1    5/2002   Al-Ahmed
(Continued)

FOREIGN PATENT DOCUMENTS

CN    103108083 A    5/2015
CN    107798252 A    3/2018
(Continued)

OTHER PUBLICATIONS

Office Action dated Mar. 12, 2021 for U.S. Appl. No. 16/913,266, 43 pages.
(Continued)

*Primary Examiner* — Obaidul Huq
(74) *Attorney, Agent, or Firm* — Amin, Turocy & Watson, LLP

(57) ABSTRACT

Communications services are provided to a device. For instance, where a communications resource is being used by a device via a first communications service provider (CSP) component associated with a first CSP, based on a probabilistic analysis of loading parameters received from a device at the first CSP component. A likelihood that the device will move can be predicted, comprising determining the likelihood is not less than a threshold likelihood. If likely to move, and based on the loading parameters, a loading profile associated with a user of the device is updated resulting in updated likelihoods of usages of the communication resource by the device via respective other CSP components other than the first CSP component. Further, based on the updated likelihoods of usages of the communication resource, at least part of the communications resource can be allocated to the respective other CSP components to facilitate communications with the device.

20 Claims, 19 Drawing Sheets

(51) Int. Cl.
  *H04W 4/50* (2018.01)
  *H04L 12/14* (2006.01)
  *H04W 4/24* (2018.01)
  *H04M 15/00* (2006.01)
  *H04L 47/70* (2022.01)

(52) U.S. Cl.
  CPC ............ *H04L 47/70* (2013.01); *H04M 15/58* (2013.01); *H04M 15/80* (2013.01); *H04W 4/24* (2013.01); *H04W 4/50* (2018.02)

(58) Field of Classification Search
  USPC ........................................ 370/310, 328, 329
  See application file for complete search history.

(56) References Cited

U.S. PATENT DOCUMENTS

| | | | |
|---|---|---|---|
| 6,392,564 | B1 | 5/2002 | Mackey et al. |
| 6,558,164 | B2 | 5/2003 | Raha |
| 6,716,106 | B2 | 4/2004 | Wang et al. |
| 7,336,297 | B2 | 2/2008 | Ishigami et al. |
| 7,451,041 | B2 | 11/2008 | Laumeyer et al. |
| 7,636,630 | B2 | 12/2009 | Fushiki et al. |
| 7,697,479 | B2 | 4/2010 | Metke et al. |
| 7,982,634 | B2 | 7/2011 | Arrighetti |
| 8,274,563 | B1 | 9/2012 | Bunch |
| 8,375,106 | B2 | 2/2013 | Sparks |
| 8,417,663 | B2 | 4/2013 | Cho et al. |
| 8,482,609 | B1 | 7/2013 | Mishra et al. |
| 8,706,131 | B2 | 4/2014 | Winters |
| 8,830,299 | B2 | 9/2014 | Osipov et al. |
| 8,924,240 | B2 | 12/2014 | Depura et al. |
| 9,036,902 | B2 | 5/2015 | Nathan et al. |
| 9,092,908 | B2 | 7/2015 | Rapoport et al. |
| 9,113,786 | B2 | 8/2015 | Li |
| 9,123,014 | B1 | 9/2015 | Erdmann et al. |
| 9,195,843 | B2 | 11/2015 | MacAskill et al. |
| 9,212,926 | B2 | 12/2015 | Attard et al. |
| 9,216,509 | B2 | 12/2015 | Renkis |
| 9,247,120 | B2 | 1/2016 | Thomas et al. |
| 9,357,181 | B2 | 5/2016 | Fujimatsu et al. |
| 9,392,508 | B2 | 7/2016 | Senarth et al. |
| 9,407,880 | B2 | 8/2016 | Renkis |
| 9,467,923 | B2 | 10/2016 | Karaoguz |
| 9,509,900 | B2 | 11/2016 | Jo |
| 9,585,038 | B2 | 2/2017 | Al-Shalash et al. |
| 9,614,958 | B2 | 4/2017 | Radermacher et al. |
| 9,747,502 | B2 | 8/2017 | Renkis |
| 9,775,001 | B2 | 9/2017 | Dunkin et al. |
| 9,809,158 | B2 | 11/2017 | Geller |
| 9,905,131 | B2 | 2/2018 | Lai |
| 9,940,530 | B2 | 4/2018 | Lai |
| 9,996,749 | B2 | 6/2018 | Bataller et al. |
| 10,057,604 | B2 | 8/2018 | Von Novak et al. |
| 10,070,035 | B2 | 9/2018 | Slavin et al. |
| 10,091,203 | B2 | 10/2018 | Galloway et al. |
| 10,225,705 | B2 | 3/2019 | Bokestad et al. |
| 10,296,794 | B2 | 5/2019 | Ratti |
| 10,305,910 | B2 | 5/2019 | Galloway et al. |
| 10,318,828 | B2 | 6/2019 | Hampiholi |
| 10,321,283 | B2 | 6/2019 | Johnson et al. |
| 10,347,127 | B2 | 7/2019 | Droz et al. |
| 10,358,143 | B2 | 7/2019 | Jain et al. |
| 10,360,481 | B2 | 7/2019 | Gopalan |
| 10,366,511 | B2 | 7/2019 | Goldman et al. |
| 10,366,586 | B1 | 7/2019 | Leizerovich et al. |
| 10,389,982 | B1 | 8/2019 | Fu et al. |
| 10,402,634 | B2 | 9/2019 | Kozakaya |
| 10,477,188 | B2 | 11/2019 | Stiglic et al. |
| 10,513,274 | B1 | 12/2019 | Sung et al. |
| 10,516,858 | B2 | 12/2019 | Watanabe et al. |
| 10,582,163 | B2 | 3/2020 | Hodge et al. |
| 10,585,942 | B2 | 3/2020 | Ramer et al. |
| 10,586,118 | B2 | 3/2020 | Guo et al. |
| 10,643,467 | B2 | 5/2020 | Mon |
| 10,735,882 | B2 | 8/2020 | Han et al. |
| 2003/0053658 | A1 | 3/2003 | Pavlidis |
| 2004/0008253 | A1 | 1/2004 | Monroe |
| 2004/0203883 | A1 | 10/2004 | Jollis |
| 2004/0218910 | A1 | 11/2004 | Chang et al. |
| 2005/0122397 | A1 | 6/2005 | Henson et al. |
| 2006/0059557 | A1 | 3/2006 | Markham et al. |
| 2006/0230030 | A1 | 10/2006 | Volpa et al. |
| 2008/0048886 | A1 | 2/2008 | Brown et al. |
| 2008/0100705 | A1 | 5/2008 | Kister et al. |
| 2008/0224862 | A1 | 9/2008 | Cirker |
| 2008/0319604 | A1 | 12/2008 | Follmer et al. |
| 2010/0182428 | A1 | 7/2010 | Lu et al. |
| 2010/0267403 | A1 | 10/2010 | Lungaro et al. |
| 2012/0120248 | A1 | 5/2012 | Han et al. |
| 2012/0324002 | A1 | 12/2012 | Chen |
| 2013/0086467 | A1 | 4/2013 | Weber et al. |
| 2013/0095879 | A1 | 4/2013 | Gupta et al. |
| 2013/0103496 | A1 | 4/2013 | Shekar et al. |
| 2013/0215266 | A1 | 8/2013 | Trundle et al. |
| 2014/0210644 | A1 | 7/2014 | Breed |
| 2014/0302774 | A1 | 10/2014 | Burke et al. |
| 2015/0042802 | A1 | 2/2015 | Kim |
| 2015/0104074 | A1 | 4/2015 | Vondran, Jr. et al. |
| 2015/0126230 | A1 | 5/2015 | Lohtia |
| 2016/0042767 | A1 | 2/2016 | Araya et al. |
| 2016/0050396 | A1 | 2/2016 | Gali et al. |
| 2016/0050588 | A1* | 2/2016 | Schoenen ............... H04W 4/24 455/453 |
| 2016/0063332 | A1 | 3/2016 | Sisbot et al. |
| 2016/0173827 | A1 | 6/2016 | Dannan et al. |
| 2016/0203641 | A1 | 7/2016 | Bostick et al. |
| 2016/0241818 | A1 | 8/2016 | Palanisamy et al. |
| 2016/0379074 | A1 | 12/2016 | Nielson et al. |
| 2016/0380820 | A1 | 12/2016 | Horvitz et al. |
| 2017/0006431 | A1 | 1/2017 | Donovan et al. |
| 2017/0063567 | A1 | 3/2017 | Tanaka et al. |
| 2017/0076599 | A1 | 3/2017 | Gupta et al. |
| 2017/0105146 | A1 | 4/2017 | Zeng et al. |
| 2017/0154638 | A1 | 6/2017 | Hwang et al. |
| 2017/0364755 | A1 | 12/2017 | Wu et al. |
| 2018/0018869 | A1 | 1/2018 | Ahmad et al. |
| 2018/0091741 | A1 | 5/2018 | Ida et al. |
| 2018/0129653 | A1 | 5/2018 | Wang et al. |
| 2018/0130354 | A1 | 5/2018 | Bender et al. |
| 2018/0131864 | A1 | 5/2018 | Bisti |
| 2018/0158197 | A1 | 6/2018 | Dasgupta et al. |
| 2018/0227768 | A1* | 8/2018 | Samdanis ............. H04W 28/24 |
| 2018/0278894 | A1 | 9/2018 | Kanga et al. |
| 2018/0332213 | A1 | 11/2018 | Kucharski et al. |
| 2018/0335781 | A1 | 11/2018 | Chase |
| 2018/0354509 | A1 | 12/2018 | Mullins |
| 2018/0376111 | A1 | 12/2018 | Mrowiec et al. |
| 2019/0001987 | A1 | 1/2019 | Kim et al. |
| 2019/0014513 | A1 | 1/2019 | Yang et al. |
| 2019/0141298 | A1 | 5/2019 | Vaidya et al. |
| 2019/0154872 | A1 | 5/2019 | Leduc |
| 2019/0172345 | A1 | 6/2019 | Lin et al. |
| 2019/0197354 | A1 | 6/2019 | Law et al. |
| 2019/0215671 | A1 | 7/2019 | Takii et al. |
| 2019/0281205 | A1 | 9/2019 | Dewasurendra et al. |
| 2019/0333113 | A1 | 10/2019 | Carlson et al. |
| 2019/0370980 | A1 | 12/2019 | Hollander et al. |
| 2019/0377345 | A1 | 12/2019 | Bachrach et al. |
| 2019/0378054 | A1 | 12/2019 | Pinel et al. |
| 2020/0033845 | A1 | 1/2020 | Park |
| 2020/0064869 | A1 | 2/2020 | Pickett |
| 2020/0074853 | A1 | 3/2020 | Miller et al. |
| 2020/0074866 | A1 | 3/2020 | Delaney et al. |
| 2020/0160985 | A1 | 5/2020 | Kusuma et al. |
| 2020/0241575 | A1 | 7/2020 | Meisenholder et al. |
| 2020/0336708 | A1 | 10/2020 | Hadas |
| 2020/0342760 | A1 | 10/2020 | Vassilovski et al. |
| 2020/0374483 | A1 | 11/2020 | Kleinrock et al. |
| 2020/0380257 | A1 | 12/2020 | He et al. |

(56) References Cited

U.S. PATENT DOCUMENTS

| | | | |
|---|---|---|---|
| 2021/0105442 | A1 | 4/2021 | Shoa Hassani Lashdan et al. |
| 2021/0266715 | A1 | 8/2021 | Uchiyama et al. |

FOREIGN PATENT DOCUMENTS

| | | |
|---|---|---|
| EP | 2 913 796 A1 | 9/2015 |
| EP | 2 937 812 A1 | 10/2015 |
| GB | 2 498 035 A | 7/2013 |
| KR | 101642487 B1 | 7/2016 |
| WO | 2019/053695 A1 | 3/2019 |
| WO | 2018/116488 A1 | 12/2019 |

OTHER PUBLICATIONS

Notice of Allowance dated Feb. 12, 2021 for U.S. Appl. No. 16/913,309, 41 pages.

Notice of Allowance dated Sep. 9, 2021 for U.S. Appl. No. 16/905,160, 60 pages.

Notice of Allowance dated Jul. 16, 2021 for U.S. Appl. No. 16/913,266, 31 pages.

"Parham Aarabi, Safwat Zaky, "Robust sound localization using multi-source audiovisual information fusion", Information Fusion, vol. 2, Issue 3, 2001, pp. 209-223, ISSN 1566-2535, https://doi.org/10.1016/S1566-2535 (01 )00035-5. (Year: 2001) ".

M. Alaei and J. M. Barcelo-Ordinas, "A hybrid cooperative design for energy-efficient surveillance in Wireless Multimedia Sensor Networks," European Wireless 2012; 18th European Wireless Conference 2012, 2012, pp. 1-7. (Year: 2012).

Alaei, Mohammad, and Jose M. Barcelo-Ordinas 2010. "A Method for Clustering and Cooperation in Wireless Multimedia Sensor Networks" Sensors 10, No. 4: 3145-3169. https://doi.org/10.3390/s100403145 (Year: 2010).

B. Chen, C. Chen and J. Wang, "Smart Homecare Surveillance System: Behavior Identification," in IEEE Transactions an Systems, Man, and Cybernetics: Systems, vol. 43, No. 6, pp. 1279-1289, Nov. 2013, doi: 10.1109/TS (Year: 2013).

Crocco et al, "Audio Surveillance: A system review", ACM Computing Surveys vol. 48 Issue 4, May 2016 Article No: 52, pp. 1-46 (Year: 2016).

Kotus, J., Lopatka, K. & Czyzewski, A. "Detection and localization of selected acoustic events in acoustic field for smart surveillance applications". Multi med Tools Appl 68, 5-21 (2014). https://doi.org/10.1007/s 11042-012-1183-0 (Year: 2014).

Lopatka, Kuba, Jozef Kot Us, and Andrzej Czyzewski. "Application of Vector Sensors to Acoustic Surveillance of a Public Interior Space." Archives of Acoustics 36.4 (2011): 851-860. (Year: 2011).

E. Menegatti, E. Mumolo, M. Nolich, and E. Pagel Io. 2004. "A surveillance system based on audio and video sensory agents cooperating with a mobile robot". In Intelligent Autonomous Systems 8. IOS Press, 335-343. (Year: 2004).

Office Action dated Sep. 8, 2021 for U.S. Appl. No. 16/902,983, 23 pages.

Roston "Google's Nearby Sharing demonstrated on video before release" https://www.slashgear.com/googles-nearby-sharing-demonstrated-on-video-before-release-24607665/. Jan. 24, 2020. 9 pages.

"Proximity and cross device communication" https://developers.google.com/nearby, Last Accessed Jun. 5, 2020. 2 pages.

Whitwam "How Google Nearby works, and how you can take advantage of it" Greenbot, https://www.greenbot.com/article/3078180/how-google-nearby-works-and-how-you-can-take-advantage-of-it.html, Jun. 13, 2016, 7 pages.

McCracken "Lyve's Photo-Organizing App Adds Mix, A Real-Time, Location-Based Sharing Feature" https://www.fastcompany.com/3045024/lyves-photo-organizing-app-adds-mix-a-real-time-location-based-sharing-feature, Apr. 13, 2015, 7 pages.

Constine "Facebook Launches "Nearby Friends" With Opt-ln Real-Time Location Sharing to Help You Meet Up" Techcrunch.com, https://techcrunch.com/2014/04/17/facebook-nearby-friends/?renderMode=ie11, Apr. 17, 2014, 29 pages.

"Sblind Proximity Sharing" https://techcrunch.com/2014/04/17/facebook-nearby-friends/?renderMode=ie11, Last Accessed Jun. 5, 2020, 3 pages.

Drang "And now it's all this" https://leancrew.com/all-this/2013/01/geofencing-in-flickr/, Jan. 6, 2013, 4 pages.

"Location Automation: A Deeper Look at Alarm.com's Geo-Services" https://www.alarm.com/blog/geo-services-location-automation, Feb. 10, 2015, 8 pages.

Idrop News Staff "What Is AirDrop?" iDROPNEWS, Nov. 7, 2017. 17 pages.

"SocialRadar app tells you about the people around you" News Atlas, Mar. 17, 2014, 9 pages.

McGarry "What Is Apple's ARKit? Everything You Need to Know" tom's guide, Jan. 24, 2018, 9 pages.

"15 Reasons To Use Drones For Security Surveillance" ALTi, https://www.altiuas.com/drone-surveillance/, Last Accessed Jun. 5, 2020, 3 pages.

"Remote monitoring by autonomous drone: a new way to secure sensitive sites" Azur Drones, https://www.azurdrones.com/remote-monitoring-by-drone/, Apr. 3, 2020, 4 pages.

Drone Automation Solution for Security & Surveillance flytbase, https://flytbase.com/drone-security-solution/, Last Accessed Jun. 5, 2020, 6 pages.

"Safe cities: Using smart tech for public security" BBC Future, https://www.bbc.com/future/bespoke/specials/connected-world/government.html, Last Accessed Jun. 5, 2020, 10 pages.

Tarapong, et al. "Swarm Eye: A Distributed Autonomous Surveillance System" IJACSA) International Journal of Advanced Computer Science and Applications, vol. 9, No. 12, 2018, 10 pages.

"Intelligent AI Video Analytics" https://www.intelli-vision.com/intelligent-video-analytics/, Last Accessed Aug. 24, 2020 3 pages.

"Icetana" Icetana, https://icetana.com/, Last Accessed Aug. 24, 2020, 4 pages.

Ma et al. "Pattern Discovery for Video Surveillance" ISVC 2005, LNCS 3804, pp. 347-354, 2005.

Priya et al. "Human walking motion detection and classification of actions from Video Sequences" International Journal of Conceptions on Computing and Information Technology, vol. 3, Issue. 1, Apr. 2015; ISSN: 2345-9808.

Paul et al. "Human detection in surveillance videos and its applications—a review" EURASIP Journal on Advances in Signal Processing 2013, 2013:176, 16 pages.

Verma et al. "A review of supervised and unsupervised machine learning techniques for suspicious behavior recognition in intelligent surveillance system" Int. j. inf. tecnol.. Sep. 20, 2019, 14 pages.

Schlenoff et al. "An Approach to Predicting the Location of Moving Objects During On-RoadNavigation" 18th International Joint Conference on Artificial Intelligence, Aug. 2003, 10 pages.

Vu et al. "Grid-based localization and local mapping with moving object detection and tracking" https://hal.archives-ouvertes.fr/hal-01023076, Jul. 11, 2014, 28 pages.

Chen, Xiaoji "Engineering Uber's Self-Driving Car Visualization Platform for the Web" Uber Engineering, https://eng.uber.com/atg-dataviz/, Aug. 28, 2017.

Stynes et al. "A Probabilistic Approach to User Mobility Prediction for Wireless Services" IEEE, 2016, 6 pages.

Guo et al. "A zone-based content pre-caching strategy in vehicular edge networks" Future Generation Computer Systems 106 (2020) 22-33.

Stanley "The Dawn of Robot Surveillance: AI, Video Analytics, and Privacy" American Civil Liberties Union, Jun. 2019, 50 pages.

Non-Final Office Action received for U.S. Appl. No. 16/902,948 dated Mar. 1, 2022, 103 pages.

Notice of Allowance received for U.S. Appl. No. 16/913,334 dated Mar. 1, 2022, 81 pages.

\* cited by examiner

US 11,356,349 B2

ADAPTIVE RESOURCE ALLOCATION TO FACILITATE DEVICE MOBILITY AND MANAGEMENT OF UNCERTAINTY IN COMMUNICATIONS

TECHNICAL FIELD

This disclosure relates generally to communication systems, and more specifically, to adaptive resource allocation to facilitate device mobility and management of uncertainty in communications.

BACKGROUND

A current challenge for communications service providers (CSPs) involves providing uninterrupted communications services to a user communicating on a mobile device. One of these challenges, among many, involves when the user is presently communicating (e.g., via a wireless mobile device) and is travelling. The user's present communications may often be affected by the speed of the vehicle in which they travel while they are communicating. There often comes a point where the user reaches a transmission/reception limit where they no longer can communicate via a respective past connection they had established via a respective CSP. The present communications service (e.g., a current call by a mobile device) is then transitioned to another communications asset of the CSP in order to facilitate uninterrupted communications service to the user as most in society have come to expect. Providing seamless and uninterrupted communications service is a difficult engineering challenge because an unlimited number of unforeseen variables can affect the transition between service points while a respective communications device is mobile (or about to become mobile). To manage such variability, respective CSPs have attempted to allocate resources to facilitate uninterrupted communications when a device is detected as mobile. Such resources can include processing capability and memory to support ongoing communications based on some indication that a respective device may be moving.

One conventional system employed by respective CSPs to provide seamless communications for a mobile device employs a user resource reservation technique. The user resource reservation system may include an access point to communicate with the device, and a network server to support the underlying communications of the device. The user resource reservation technique may include predicting a next access point that is to be reached by a mobile user; and sending resource reservation designating information to the next access point. The respective next access point reserves a resource for the user according to the resource reservation designating information. If the next access point can be reached by the user (e.g., detected by CSP prediction of mobility), the next access point may be instructed to reserve a resource for further user communications, such that the next access point is instructed in advance to reserve an appropriate resource for the user. This conventional resource reservation strategy attempts to ensure that the user is successfully handed over to a network, thus potentially increasing a probability of successful handover of the user to other network assets. Unfortunately, reserving resources based on device mobility alone can cause a gross misallocation or overallocation of resources on the part of the CSP. This type of misallocation of resources often leads to increased costs by the CSP and therefore may be also passed on to the device user (having no need for such resources) to support uninterrupted communications as typically has come to be expected in modern society.

The above-described background relating to relating to communications, is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
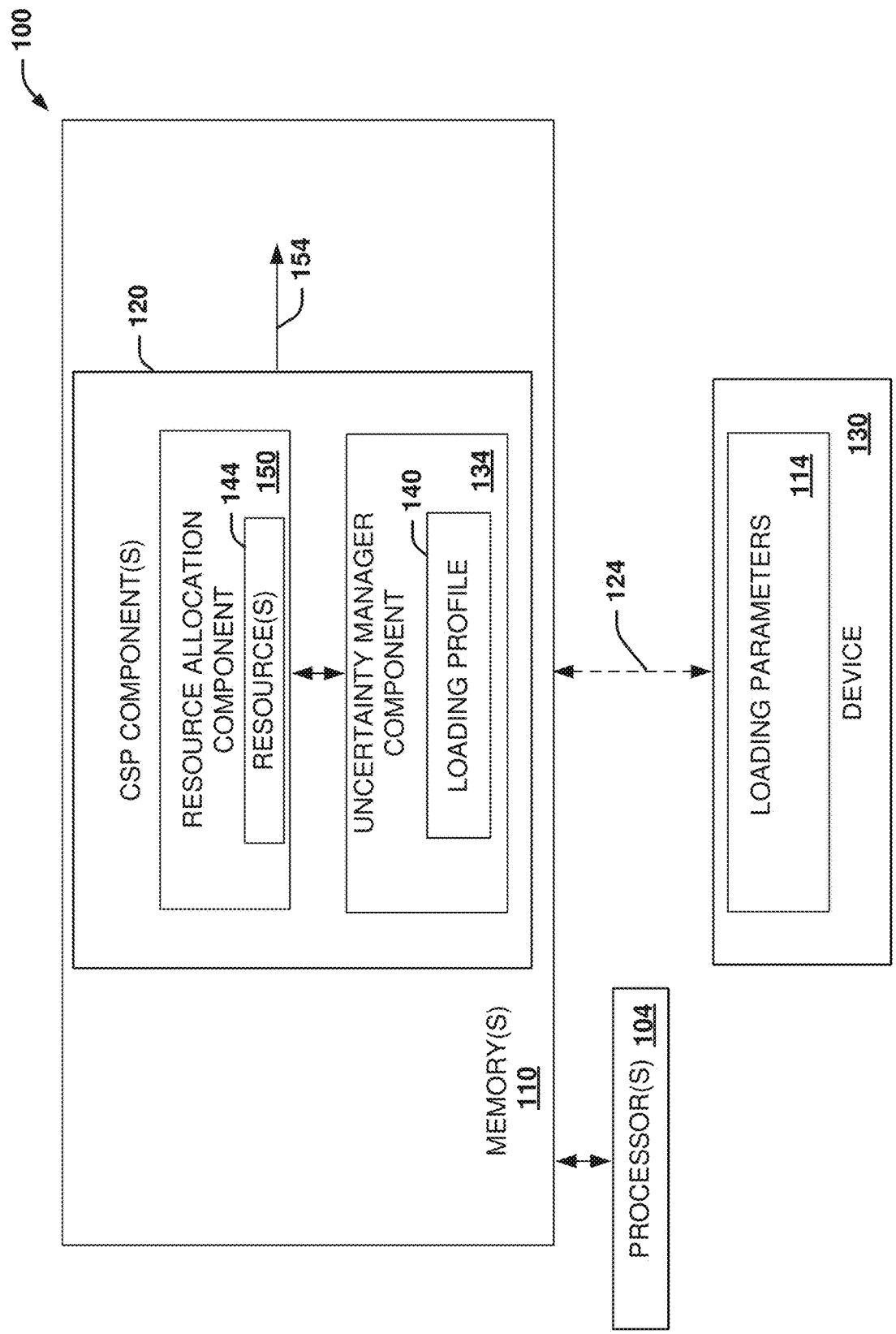
FIG. 1 illustrates an example communication system that adaptively allocates communications resources to support device communications in accordance with various aspects and embodiments of the subject disclosure.

This disclosure relates to adaptive resource allocation to facilitate device mobility and management of uncertainty in communications. Adaptive resource allocation refers to the ability of a communications service provider (CSP) to provide resources (e.g., computing, memory, substantially uninterrupted service from one station to the next) that support communications with respect to a given device (e.g., device that becomes mobile in the future) when conditions related to the device are subject to quantum conditions (e.g., random human-decision making) or events (e.g., unforeseen acts of nature). Such conditions are impossible to predict ahead of time (e.g., will device become mobile in the future, will a planned route in which the device is presently communicating change course, will device communications loads change unexpectedly, etc.). These uncertain conditions are subject to the uniqueness of human decision-making that cannot be determined ahead of time. Such uncertain events are related to a device user's ability to change their mind regarding device communications requests or demands at a moment's notice, which can cause current communications systems to over-allocate resources. Such over-allocation is based on a noble desire by service providers to provide uninterrupted service in case of emergency. Before discussion of adaptive resource allocation in view of uncertainty, a brief review of existing issues and complexities with modern communications systems is provided.

Most can appreciate how rapidly society has changed regarding technological systems and innovation in general. However, most do not consider how familiarity of such systems leads to the assumption that because a service/system has worked reliably in the past, it therefore will reliably operate in the future as expected. Not long ago, for example, most were comfortable having a single, hard-wired telephone in their homes that more than satisfied their desired communications requests or demands at the time. Even those hard-wired telephone systems that may have seemed reliable at the time due to familiarity of use, could be subject to unpredictable events that were impossible to predict at any given instant of time. Because of unpredictability (e.g., acts of nature, human decision making causing over-loaded telephone lines), no system past, present, or future can be designed ahead of time to account for all such events that are subject to quantum conditions of uncertainty (e.g., having infinite complexity and infinite unpredictability and per device user).

For example, the average telephone user became accustomed to expecting that if an emergency were to occur, they could pick up their phone at any time and contact an entity (e.g., police/fire) to help them manage a given situation to the best of their ability at a given moment of time. That might normally be the case unless everyone else in the country were attempting to communicate at the same time (e.g., 9/11 type event). However, if a quantum event/condition were to occur, such as a fallen tree or lighting (e.g., quantum act of nature) leading to a downed communication line, no amount of foresight/engineering could possibly be put in place ahead of time as a remedy that could be reasonably offered and also that people could reasonably afford.

Suppliers of any system/service that is designed ahead of time are limited by available resources they can supply (e.g., to remain a viable business entity) whereas most consumers of a given service/system are not willing to pay more than a reasonable amount of their respective limited resources for such service/system. Engineers are faced with an almost impossible challenge of deciding in advance what is a reasonable amount of service/risk given reasonable circumstances in view of limited resources at their disposal to manage communications bandwidth ahead of time. A common strategy employed to manage risk (e.g., providing uninterrupted service for emergency) at reasonable cost to all involved is referred to as worst-case design strategy. Engineers attempt to account for the most likely unpredictable events (e.g., earthquakes, tornados, downed power lines), build in an additional margin to account for unforeseen conditions, and then attempt to satisfy those conditions at the most efficient costs of supply in the future.

As mentioned, attempting to offer reliable communications services that people have come to expect is an almost impossible task given the quantum nature of human decision making (e.g., a human is capable of an infinite number of random decisions that are impossible to predict ahead of time). Applying worst-case design strategies, such as allocating worst-case communications bandwidth for most users who may demand much less bandwidth, in most instances, has often led to a gross over-allocation of communications resources that places both service suppliers and consumers at an economic disadvantage. This type of misallocation is often felt in cable TV services, for example. Service providers commonly provide 500 channels or more to their users because they cannot predict ahead of time what channels any given human may be interested in at any given moment of time. Many consumers of such services are often wondering why they pay for so many channels when they often watch a limited fraction (e.g., 10 channels) of the overall number of channels provided. Balancing this implicit expectation for almost unlimited communications capability and serving these expectations without disruption of service has become an enormous challenge in modern communications systems (e.g., systems supplying Internet services, cable TV services, wireless services, and cloud services).

This disclosure describes predictive systems and methods to reserve network resources (e.g., memory and processor bandwidth), e.g., systems, machine readable media, and methods that serve devices (e.g., mobile devices) in an efficient manner that reduce costs for CSPs and device users served by the CSPs. As mentioned infra, conventional systems allocate resources between access points based on a determination of device mobility alone. Such a limited systems design approach of such conventional systems often leads to an over-allocation of resources which causes CSPs to spend valuable resources to ensure seamless mobile communications and often leads to consumers of such services paying for more than they typically desire to use. The systems and methods described herein can employ probabilistic analysis (e.g., statistical, inference, AI) to support a given device user's current communications requests or demands and allocate resources based on the likelihoods that communications loading and/or mobile route destinations may change in the future. For instance, determined higher likelihood communications situations can allocate resources based on a priority assigned to the given situation. For example, a given mobile user may currently be in contact with a first CSP node and could potentially reach two or more other CSP nodes. Based on past history, current speeds and detected potential destination plans, one CSP node may have a higher likelihood as the next destination for the respective mobile device and thus can allocate more resources based on the determined likelihood. The lower priority CSP can allocate fewer resources in the case it is used in the unlikely event the user changes their minds and travels toward the lower priority CSP where resources can be reallocated if mobile conditions and/or destinations change.

Based on human random decision making, communications loads can change unpredictably and thus affect allocation of resources between CSP nodes. For example, based on an analysis of a given device and user profile, it may be determined that when a given user travels from point A to point B they typically use about 1 megabyte of memory resources and about one percent of given processor resources at a given edge node supporting communications for the respective CSP. However, on a given day, a user may decide at random (e.g., based on a current conversation with another user) that they desire to transfer a very large file from their respective mobile device to the other user. The transfer may be so large, that it may not be able to occur between a given device and edge node before the speed of travel of device disrupts the current download of the file. In such cases of unpredictable communications loading changes, a determination of urgency can be achieved via device interfaces where the user can be queried such as whether the given file has to be transferred immediately or whether it can be transferred over the course of much longer time period thus mitigating the demands on systems resources. The user can be notified via the interface that if longer time periods are suitable, much lower costs can be charged to their account since resources can be allocated more efficiently to allow the large file transfer to occur in planned stages along a determined mobile route for the device.

In one example, a system can include components for monitoring loading parameters received at a first CSP component associated with a first CSP via a communications signal that was transmitted by a device. Based on a probabilistic analysis of the loading parameters to determine a likelihood of mobility of the device, the system can include analyzing, by the first CSP component, a loading profile, wherein the loading profile can describe different likelihoods of usage of a communications resource associated with the first CSP. The different likelihoods of usage can correspond to a result of the probabilistic analysis of the loading parameters. Based on the loading parameters and the probabilistic analysis of the loading profile, the system can include allocating, by the first CSP component, the communications resource to facilitate device communications. System operations can also include electronically sharing the loading profile to at least a second CSP component associated with a second CSP to facilitate communications with the device based on a prediction of movement of the device determined from the loading parameters or the loading profile.

In another example, a method can be provided that includes monitoring, by a first CSP component of a system comprising a processor, loading parameters obtained via a communications signal received from a device. Based on a probabilistic analysis of the loading parameters to determine a likelihood of mobility of the device, the method can include analyzing, by the first CSP component, a loading profile that describes different likelihoods of usage of a communications resource associated with the first CSP. Based on the loading parameters and the probabilistic analysis of the loading profile, the method can include allocating, by the first CSP component, the communications resource to facilitate communications with the device.

In yet another example, a non-transitory machine-readable storage medium, comprising executable instructions that, when executed by a processor, facilitate performance of operations, can include monitoring loading parameters via a communications signal originating from a device. The instructions can include analyzing a loading profile based on a probabilistic analysis of the loading parameters to determine a likelihood of mobility of the device, wherein the loading profile describes different likelihoods of usage of communications resources that facilitate communications with the device. The instructions can include allocating the communications resources based on the loading parameters and the probabilistic analysis of the loading profile.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

These and other embodiments or implementations are described in more detail below with reference to the drawings. Repetitive description of like elements employed in the figures and other embodiments described herein is omitted for sake of brevity.

FIG. 1 illustrates an example communication system 100 that adaptively allocates communications resources to support device communications in accordance with various aspects and embodiments of the subject disclosure. The system 100 includes a processor 104 (or processors) and a memory 110 (or memories) that stores executable instructions that, when executed by the processor, facilitate performance of operations. The operations include monitoring loading parameters 114 received at a first CSP component 120 (or components) associated with a first CSP (not shown) via a communications signal 124 that was transmitted by a device 130. An uncertainty manager component 134 can be provided to monitor the loading parameters 114 received via the communications signal 124 from the device 130. Based on a probabilistic analysis of the loading parameters to determine a likelihood of mobility of the device by the uncertainty manager component 134, the operations include analyzing, by the first CSP component 120 and/or the uncertainty manager component, a loading profile 140.

The loading profile 140 can be employed as a model that can describe different likelihoods of usage of a communications resource 144 associated with the first CSP 120, wherein the different likelihoods of usage correspond to a result of the probabilistic analysis of the loading parameters 114. Based on the loading parameters 114 and the probabilistic analysis of the loading profile 140, the operations of the system 100 include allocating, by a resource allocation component 150 in the first CSP component 120, the communications resource 144 to facilitate communications with the device 130. The operations of the system 100 can also include electronically sharing the loading profile 140 via output 154 to at least a second CSP component (see e.g., FIG. 2) associated with a second CSP to facilitate communications with the device 130 based on a prediction of movement of the device determined from the loading parameters 114 or the loading profile 140.

The loading parameters 114 received via the signal 124 from the device 130 can include a velocity parameter relating to the speed of travel of the mobile device, a device identification number, a user identification number, a direction of travel parameter, an intended destination parameter, a number of device applications in use, or device data to be communicated. Such loading parameters 114 can be used to make predictions based on past device and/or user activities and allow efficient allocation of communications resources 144 across one or more CSP components. The loading profile 140 can include current or past device processor demands, current or past device memory demands, detected velocity of the device, the device identification number, the user identification number, the direction of travel parameter, the intended destination parameter, an urgency indicator parameter, an economic indicator parameter, or privacy setting parameters. The urgency indicator parameter and economic indicator parameter allow resources to be allocated more efficiently based on whether uncertain device communications loads are to be transmitted with urgency or can be transmitted over a longer course of time which reduces current resource allocation requests or demands of the CSP component 120. Such urgency processing is further described below with respect to FIG. 11.

The device 130 can be a wireless device, a mobile device, or a wireless mobile device that transmits the communications signal 124. Further description of the device 130 and associated CSP components and resources to communicate with the device are described below with respect to FIGS. 3 through 8. Before proceeding with a discussion of FIG. 2, one or more device and network configurations for the system 100 are provided.

In one or more embodiments, the system 100 can comprise one or more user equipment (UEs) operating as the device 130. The non-limiting term user equipment (UE) can refer to any type of device 130 that can communicate with a network node or network equipment in a cellular or mobile communication system, for example. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment can also comprise IOT devices 130 that communicate wirelessly.

In various embodiments, the system 100 is or comprises a wireless communication network serviced by one or more wireless communication network providers. In example embodiments, a UE operating as the device 130 can be communicatively coupled to the wireless communication network via a network node of the CSP component 120. The network node (e.g., a network node device or network equipment) can communicate with user equipment (UE), thus providing connectivity between the UE and the wider cellular network. The UE can send transmission type recommendation data to the network node (e.g., see e.g., access point 314 and edge node 324 of FIG. 3). The transmission type recommendation data can comprise a recommendation to transmit data via a closed loop MIMO mode and/or a rank-1 precoder mode.

A network node can have a cabinet and/or other protected enclosures, an antenna mast, and multiple antennas for performing various transmission operations (e.g., MIMO operations). Network nodes can serve several cells, also called sectors, depending on the configuration and type of antenna. In example embodiments, the UE can send and/or receive communication data via a wireless link to the network node. The device 130 or UE can communicate with the network node and include downlink (DL) communications from the UE to the network nodes as well as uplink (UL) communications.

The system 100 can further include one or more CSP networks that facilitate providing wireless communication services to various UEs, including device 130, via the network node and/or various additional network devices (not shown) included in the one or more CSP networks. The one or more CSP networks can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large-scale wireless communication network that spans various geographic areas. According to this implementation, the one or more CSP networks can be or include the wireless communication network and/or various additional devices and components of the wireless communication network (e.g., network equipment, additional network devices or equipment and cell, additional UEs, network server devices or equipment, and so forth). A network node can be connected to the one or more CSP networks via one or more backhaul links. For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links can also include wireless link components, such as but not limited to, line-of-sight (LOS) or non-LOS links which can include terrestrial air-interfaces or deep space links (e.g., satellite communication links for navigation).

The system 100 can employ various cellular systems, technologies, and modulation modes to facilitate wireless radio communications between devices (e.g., the UE and the network node). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 and so forth. For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices 130 or UEs of the system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the different communication requests or demands applicable to these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >7 GHz) to aid in increasing capacity. Currently, much of the millimeter wave (mmWave) spectrum, the band of spectrum between 30 GHz and 300 GHz is underutilized. The millimeter waves have shorter wavelengths that range from 11 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems can be a part of the 3rd and 4th generation wireless systems, and may be planned for use in 5G systems.

Figure 2:
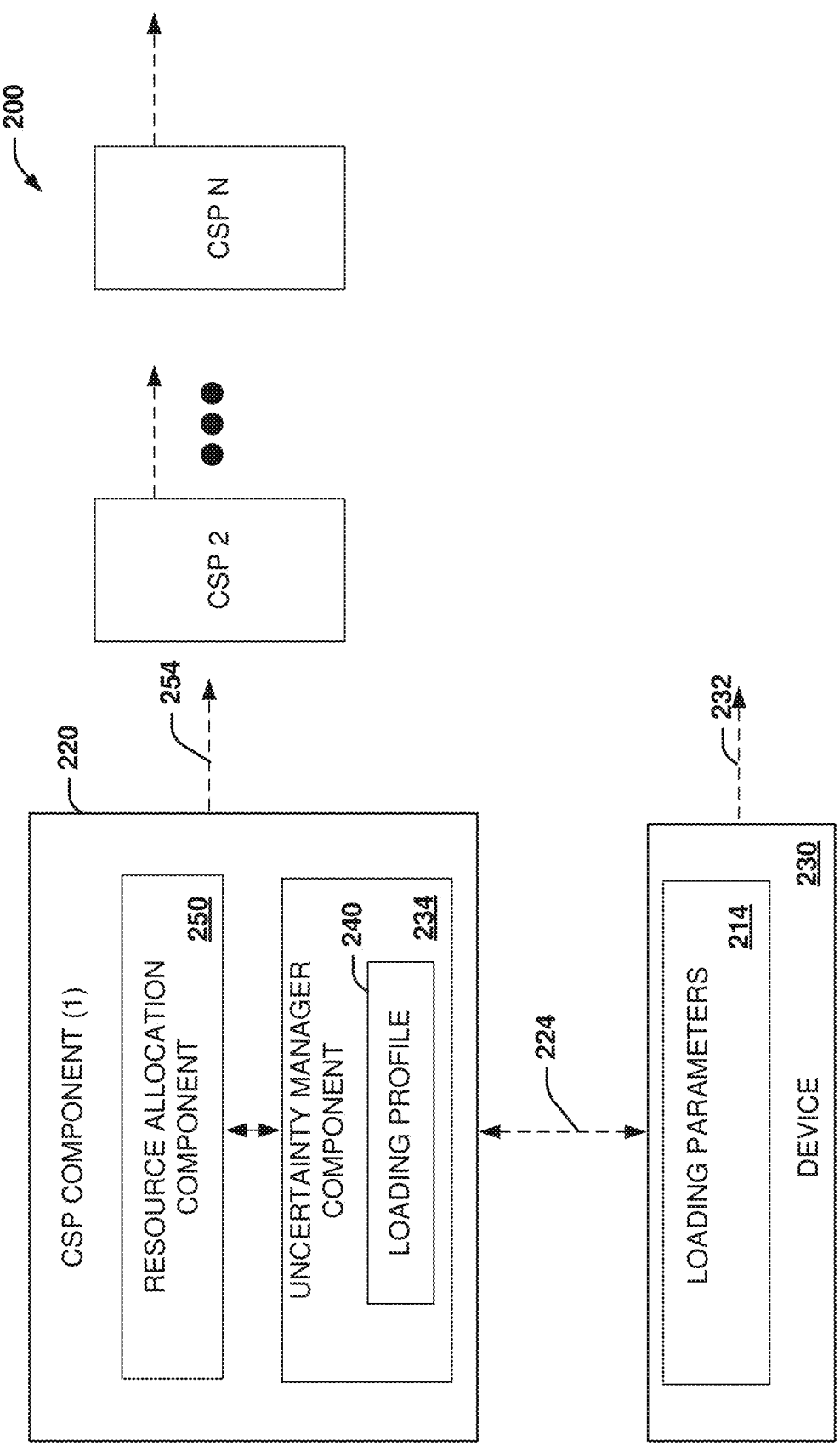
FIG. 2 illustrates an example communication system that adaptively allocates communications resources to support device communications based on a prediction of device mobility in accordance with various aspects and embodiments of the subject disclosure.

FIG. 2 illustrates an example communication system 200 that adaptively allocates communications resources to support device communications based on a prediction of device mobility in accordance with various aspects and embodiments of the subject disclosure. Similar to the system 100 described above, the system 200 performs various operations to support allocating communications resources between CSP nodes based on predictions of device mobility and in view of uncertainty in device loading requests or demands and/or uncertainty in route destinations of the mobile device. The operations of the system 200 include monitoring loading parameters 214 received at a first CSP component 220 (or components) associated with a first CSP (not shown) via a communications signal 224 that was transmitted by a device 230. A direction arrow 232 indicates mobility of the device 230 from one location to another. An uncertainty manager component 234 can be provided to monitor the loading parameters 214 received via the communications signal 224 from the device 230. Based on a probabilistic analysis of the loading parameters 214 to determine a likelihood of mobility of the device by the uncertainty manager component 234, the operations include analyzing, by the first CSP component 220 and/or the uncertainty manager component 234, a loading profile 240.

The loading profile 240 can be employed as a model that can describe different likelihoods of usage of a communications resource (not shown) associated with the first CSP component 220, wherein the different likelihoods of usage correspond to a result of the probabilistic analysis of the loading parameters 214. Based on the loading parameters 214 and the probabilistic analysis of the loading profile 240, the operations of the system 200 can include allocating, by a resource allocation component 250 in the first CSP component 220, the communications resource to facilitate communications with the device 230. The operations of the system 200 can also include electronically sharing the loading profile 240 via output 254 to at least a second CSP component shown as CSP 2 associated with a second CSP to facilitate communications with the device 230 based on a prediction of movement of the device determined from the loading parameters 214 or the loading profile 240. As shown, in addition to CSP 2, a plurality of other CSPs up to CSP N, N being a positive integer, can be potential communications providers for the device 230 depending on speed and desired routes of the user which can be subject to uncertainty as described herein. As will be shown in FIGS. 3 through 8, high level nodes (e.g., cloud nodes) and networks (e.g., cloud networks) can be provided to manage the collection of potential CSPs from CSP 1 though CSP N. As the device 230 continues along a mobile path, the loading profile 240 can be shared with respective CSPs to enable allocation of resources on CSPs that may come in range of the device and further facilitate ongoing device communications.

Figure 3:
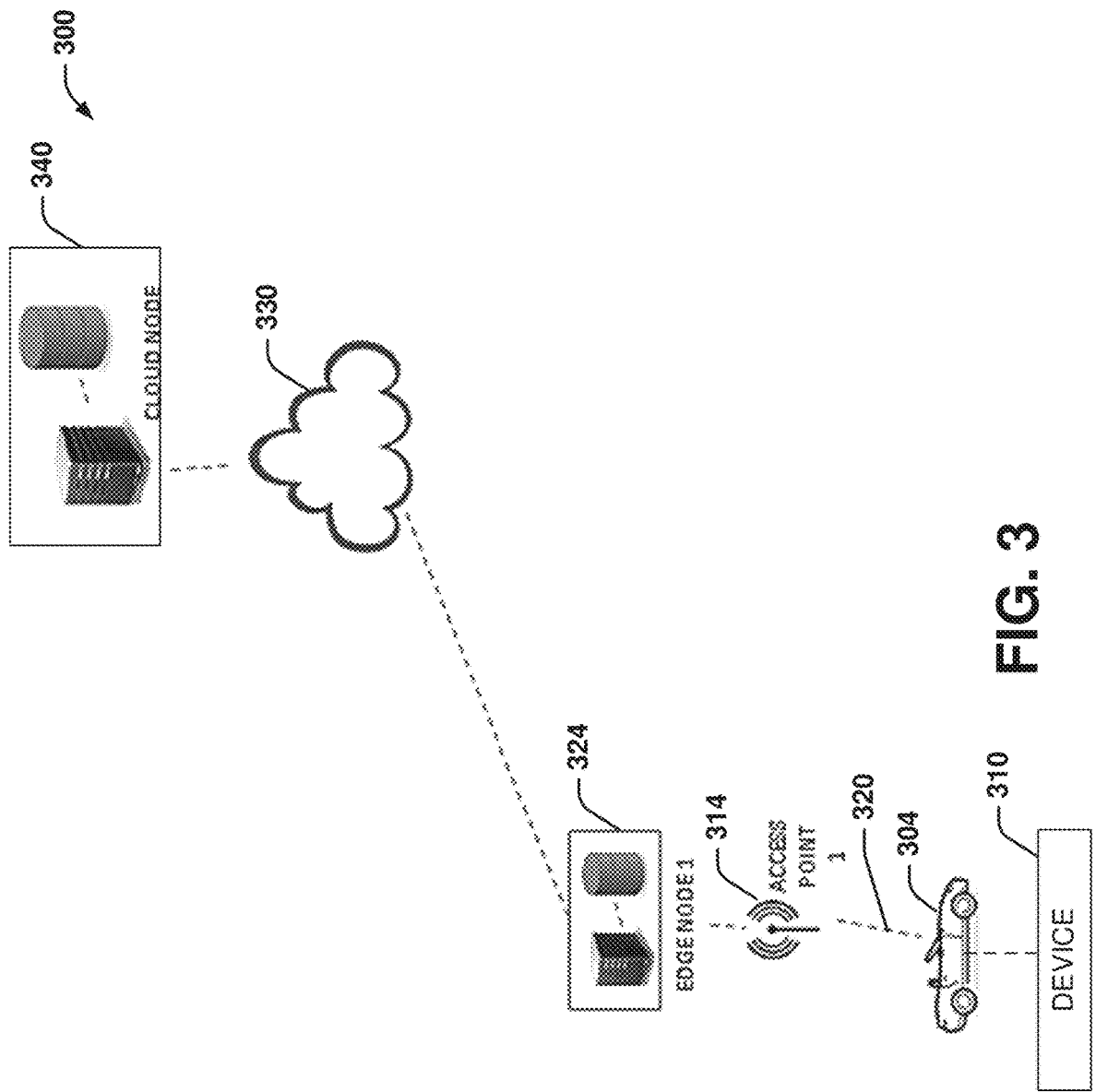
FIG. 3 illustrates an example communication system implementation that adaptively allocates communications resources to support a prediction of device mobility in accordance with various aspects and embodiments of the subject disclosure.

FIG. 3 illustrates an example implementation of a communication system 300 that adaptively allocates communications resources to support a prediction of device mobility in accordance with various aspects and embodiments of the subject disclosure. In this example, a representation of an automobile 304 is provided that represents an example of device mobility for a device 310. The device 310 can become mobile according to various examples, such as autonomous and non-autonomous vehicle movements, aircraft movements, and/or become mobile by a person walking with the device (see, e.g., FIG. 8). As shown, the system 300 can include an access point 314 (or access points) to receive a communications signal 320 from the device 310. The access point can be a wireless cell phone tower or base station in one example. An edge node 324 can be operatively coupled to the access point 314 to determine communications resources to support communications with the device 310. The communications resources of the edge node 324 can include data storage and processor utilization to support communications with the device 324. Data storage can include memory to support file storage and/or application execution resources to facilitate communications with the device 310.

In one example, the edge node 324 can record a duration of time the communications resources are provided to the device 310. The duration of time can be shared with subsequent CSP components to facilitate communications with the device 310. In another example, the edge node 324 can determine a prediction that the device exits a range of a current edge node supporting device communications to a subsequent edge node based on a detected speed and direction of the device 310 wherein the subsequent edge node may be discovered from a cloud node 330 (or cloud nodes) that maintains a data base of edge nodes. As shown, the edge node 324 can communicate with the cloud node 330 via one or more cloud connected networks represented at 340. In other examples, at least two edge nodes can be analyzed at the cloud node 330 and assigned a likelihood that the device may move in range of the respective edge nodes, wherein resources are allocated at the respective edge nodes based on the likelihood. Also, communications resources can be released by a given edge node from supporting a given device 310 that has moved outside of a range supported by the given edge node. In yet another example, the cloud node 330 can aggregate a collection of edge node resource demands to create a forecast of future resource demands for the collection of edge nodes.

In some cases, at least one other device (see e.g., FIG. 8) can be detected by the edge node 324 or the cloud node 330 and employed to supply communications resources to support communications to the device.

In this example, a mobile device 310 may be connected to edge node 324 via access point 314. During the connection, edge node 324 may provide resources to the mobile device 310. Edge node 324 may make a record of a quantity of resources that it supplies to the device 310. These resources may include an amount of storage, bandwidth, CPU utilization, and other resources, for example. Edge node 324 may also record what the duration of time is during which the resources are provided. The mobile device 310 may also supply other data to the edge node 324, such as the loading parameters described herein that can include speed of the mobile device, a device ID, a user ID, a direction of travel, an intended destination, device applications in use, and/or other data. Using the data that is recorded regarding the amount of resources supplied by edge node 324 to the mobile device 310, edge node 324 can develop a model of the current resource requests or demands for the mobile device, such as the loading profile described herein. Edge node 324 may also use the speed and directional data supplied by the mobile device 310 to predict a time that the device will exit the range of access point 314. Edge node 324 may also provide this data to the cloud node 330 that can maintain a database of other edge nodes adjacent to edge node 324, their maximum resource capacities, and/or their current resource utilizations. Edge node 324 can also use the current resource requests or requirements of the mobile device 310 as a prediction of resource requests when the mobile device 310 exits the range of edge node 324.

Figure 4:
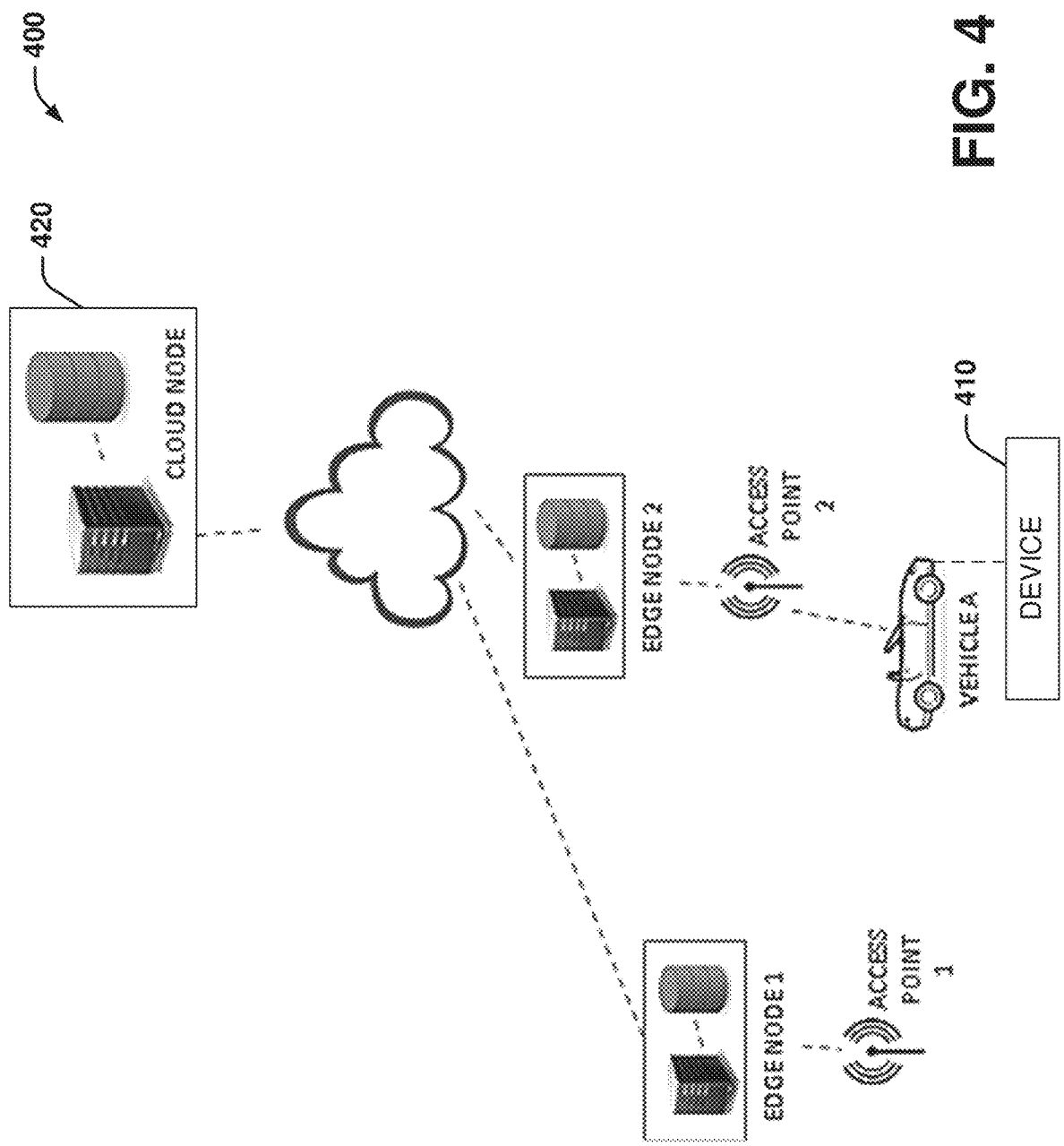
FIG. 4 illustrates an example communication system implementation that adaptively allocates communications resources to support device communications based on a prediction of device mobility in accordance with various aspects and embodiments of the subject disclosure.

FIG. 4 illustrates an example implementation of communication system 400 that adaptively allocates communications resources to support device communications based on a prediction of device mobility in accordance with various aspects and embodiments of the subject disclosure. In this example, device 410 associated with vehicle A exits from access point 1 that is supported by edge node 1 and transitions to access point 2 that is supported by edge node 2 in this example. By communicating the current resource demands of the mobile device 410, to a cloud node 420 (or directly to edge node 2), edge node 1 may communicate an expected resources request or need (e.g., via loading profile) to edge node 2 before the mobile device 410 enters the range of access point 2. For example, edge node 2 may have been determined to be the next access point/edge node to be encountered by the mobile device 410 based on the data sent from edge node 1 regarding speed, direction of travel, intended destination, predicted time and location when the device will enter the range of access point 2. Edge node 2 can also reserve resources in accordance with the predicted requests or needs of the device 410 at the predicted time that that will be used by edge node 2. This future requests or need of resources at edge node 2, for example, may alternatively be used by edge node 2 to forecast future expected resource utilization.

Figure 5:
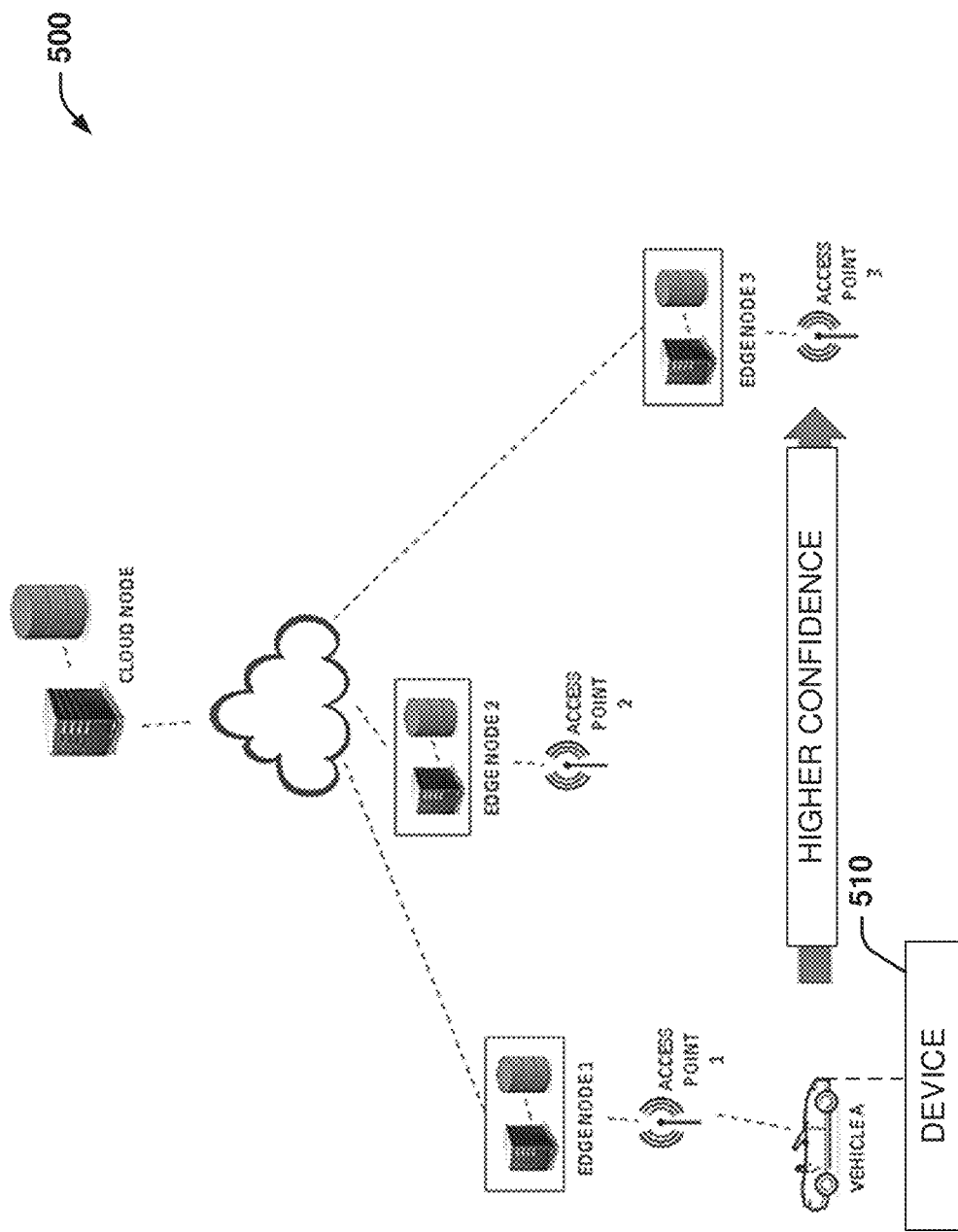
FIG. 5 illustrates an example communication system implementation that adaptively allocates communications resources to support device communications based on a prediction of device mobility and device route uncertainty in accordance with various aspects and embodiments of the subject disclosure.

FIG. 5 illustrates an example implementation of a communication system 500 that adaptively allocates communications resources to support device communications based on a prediction of device mobility and device route uncertainty in accordance with various aspects and embodiments of the subject disclosure. In this example, predictions are made for resource allocations of a next node based on a variable route condition where uncertainty is involved with a given route plan for a device at 510. As shown in this example, a higher confidence or statistical likelihood may be determined that the device 510 will arrive at access point 3 versus access point 2 as in the previous example. For example, it may be the case that the expected next node for the mobile device after edge node 1 may be uncertain. Thus, the device 510 direction of travel may be known, such as if the mobile device is following a planned route and the planned route is communicated to edge node 1. This may be the case if the device is in an autonomous vehicle, for example. If the device is traveling along a planned or extrapolated route, a prediction may be made of a mapped route that the device 510 can take. If a planned route is being followed, the prediction may be that the device 510 may travel to edge node 3, which is the next access point along the planned route.

Figure 6:
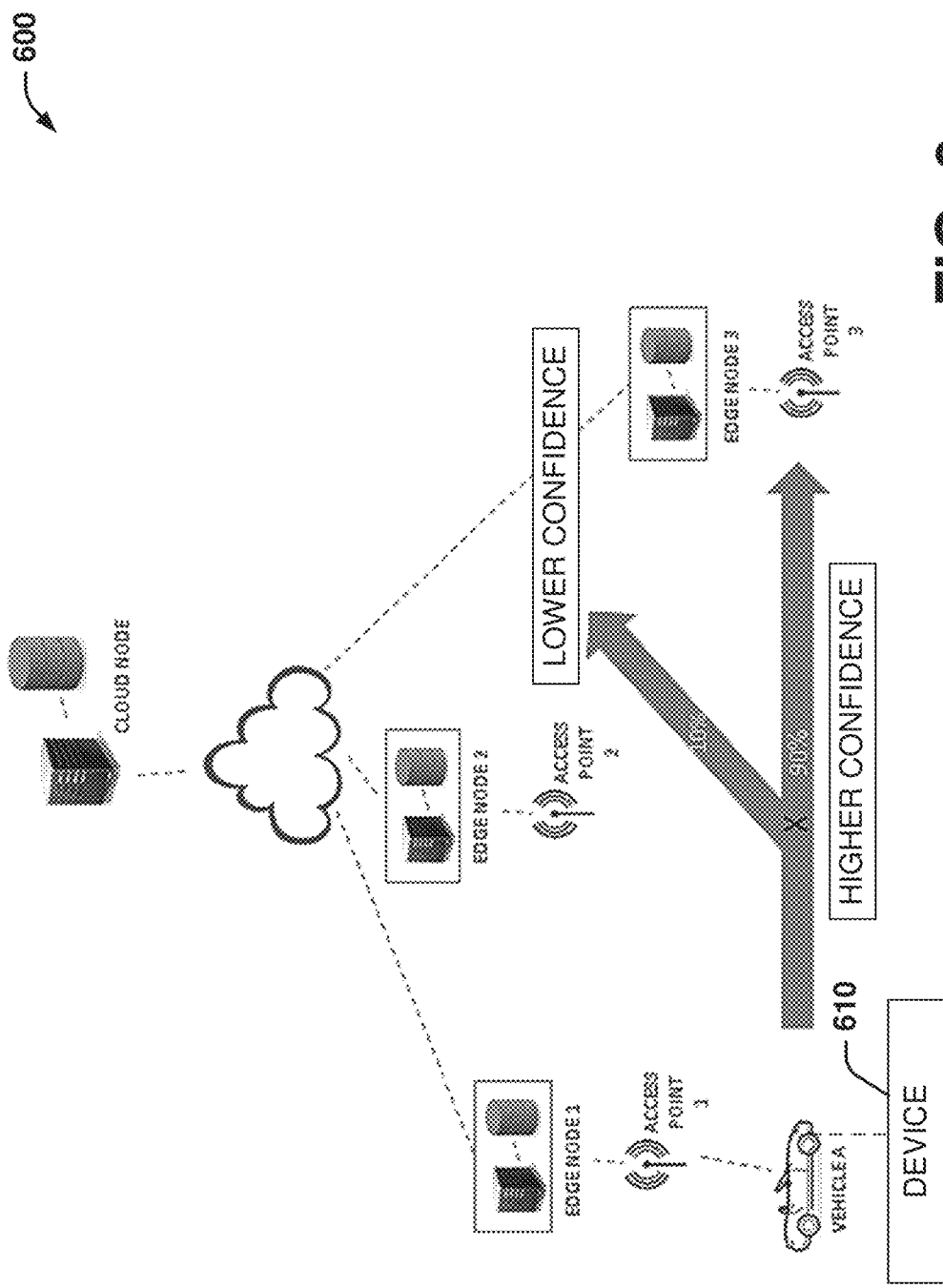
FIG. 6 illustrates an example communication system implementation that adaptively allocates communications resources to support device communications based on a prediction of device mobility and determined likelihood of device route uncertainty in accordance with various aspects and embodiments of the subject disclosure.

FIG. 6 illustrates an example implementation of a communication system 600 that adaptively allocates communications resources to support device communications based on a prediction of device mobility and determined likelihood of device route uncertainty in accordance with various aspects and embodiments of the subject disclosure. In this example, it may be determined that there is a higher confidence (e.g., 90%) or likelihood that a device 610 will arrive at edge node 3 as its next access point versus a lower confidence (e.g., 10%) or likelihood the device will arrive at edge node 2 via access point 2. Based on such determined likelihoods, resources can be allocated accordingly at the respective edge nodes where greater resource allocations can occur at the most likely destination whereas fewer resources can be allocated at the lower confidence access point and associated edge node.

If an unspecific route is considered, the predicted route may be determined using historical data from the specific device's previous travels or historical data from an aggregation of prior devices traversing the route, for example. For instance, if 90% of all devices traversing the route over a prior period of time travel to access point 3's range, then access point 3 and node 3 can be alerted with 90% confidence that the device 610 can be arriving at the predicted time and can also stay within access point 3's range for a predicted duration of time. Likewise, access point 2 and edge node 2 can be altered such that they may provide resources for the mobile device 610 beginning at a predicted location and for a predicted time with 10% confidence. The respective access points and edge nodes may reserve resources with a higher or lower priority based on the confidence levels determined as described herein.

Figure 7:
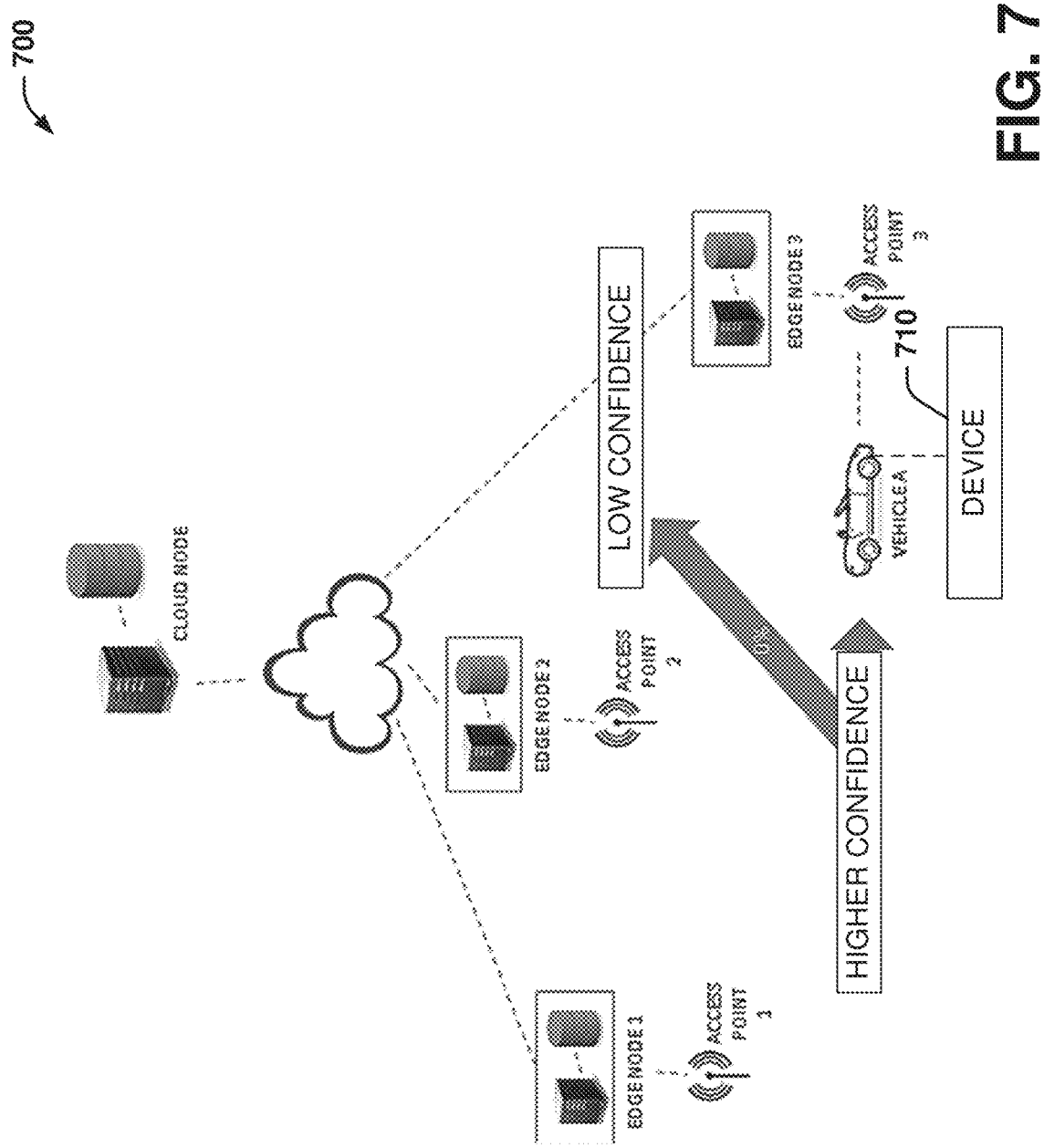
FIG. 7 illustrates an example communication system implementation that adaptively allocates communications resources to support device communications based on a prediction of device mobility and a different determined likelihood of device route uncertainty in accordance with various aspects and embodiments of the subject disclosure.

FIG. 7 illustrates an example implementation of a communication system 700 that adaptively allocates communications resources to support device communications based on a prediction of device mobility and a different determined likelihood of device route uncertainty in accordance with various aspects and embodiments of the subject disclosure. In this example, resources that have been previously allocated for potential use by a given device 710 can be released for other uses after a given device has passed a given access point and edge node. Since the device 710 may continually report data updates, including its current location, to the respective access points and edge nodes, e.g., edge node 1. For example, edge node 1 may detect that the device has passed a waypoint X that would take it out of the range of access point 2 in this example where a low confidence (e.g., 0%) that edge node 2 will be employed in further device communications. When detected, for example, edge node 2 may update the predictions of confidence levels and notify edge node 1 and 3.

Figure 8:
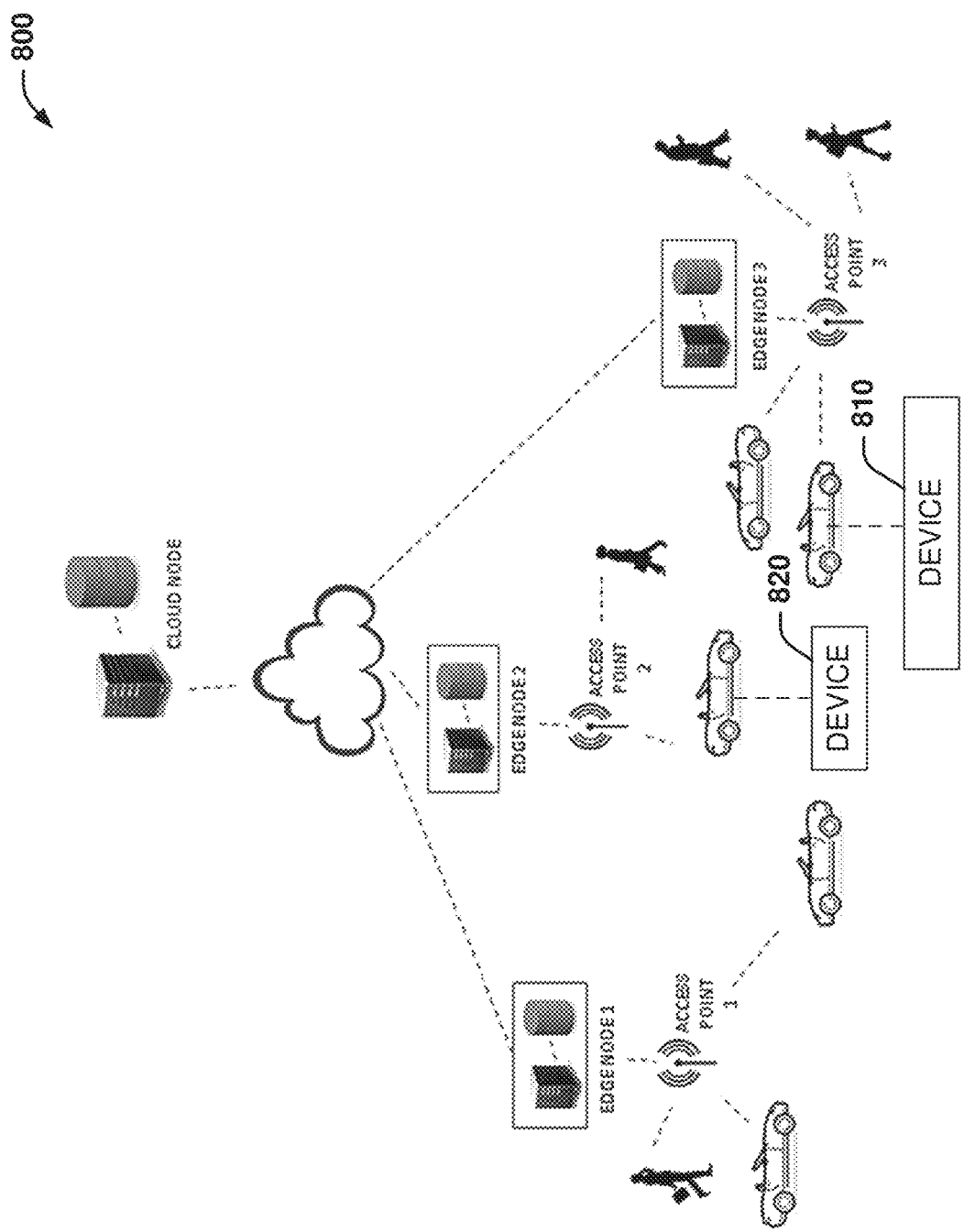
FIG. 8 illustrates an example communication system implementation that adaptively allocates communications resources to support device communications based on a prediction of device mobility and in view of uncertain resource availability that can be aggregated in accordance with various aspects and embodiments of the subject disclosure.

FIG. 8 illustrates an example implementation of communication system 800 that adaptively allocates communications resources to support device communications based on a prediction of device mobility and in view of uncertain resource availability that can be aggregated in accordance with various aspects and embodiments of the subject disclosure. In this example, an aggregate collection of device data and predictions may be used by a collection of edge nodes shown as edge node 1, 2, and 3 in this example to continually update their forecasted resource demands. Each device (e.g., associated with the depicted vehicles communicating with the respective edge nodes) may contribute a predicted resource demand that can exist for a predicted period of time providing a sum aggregation that can create a forecast of system resources that can be shared among edge nodes and/or devices.

In some examples, device owners may elect to allow the resources of their respective devices to be used by other devices in the configuration that communicate with a given edge node. This may be particularly useful in the event that an edge node's aggregate forecast predicts an upcoming over demand for resources. In this event, for example, if edge node 3 forecasts an upcoming over demand of CPU resources, it may predict that device 810 can be in the range of access point 3 during the time of predicted over demand and may send a request to device 810 to accept a set of tasks requesting or demanding CPU resources to complete during the over demand time. Similarly, edge node 3 may determine that device 820 is not in range of access point 3 presently, but is predicted to be there during the over demand time. In that case, device 820 may likewise receive a similar request from edge node 3.

Figure 9:
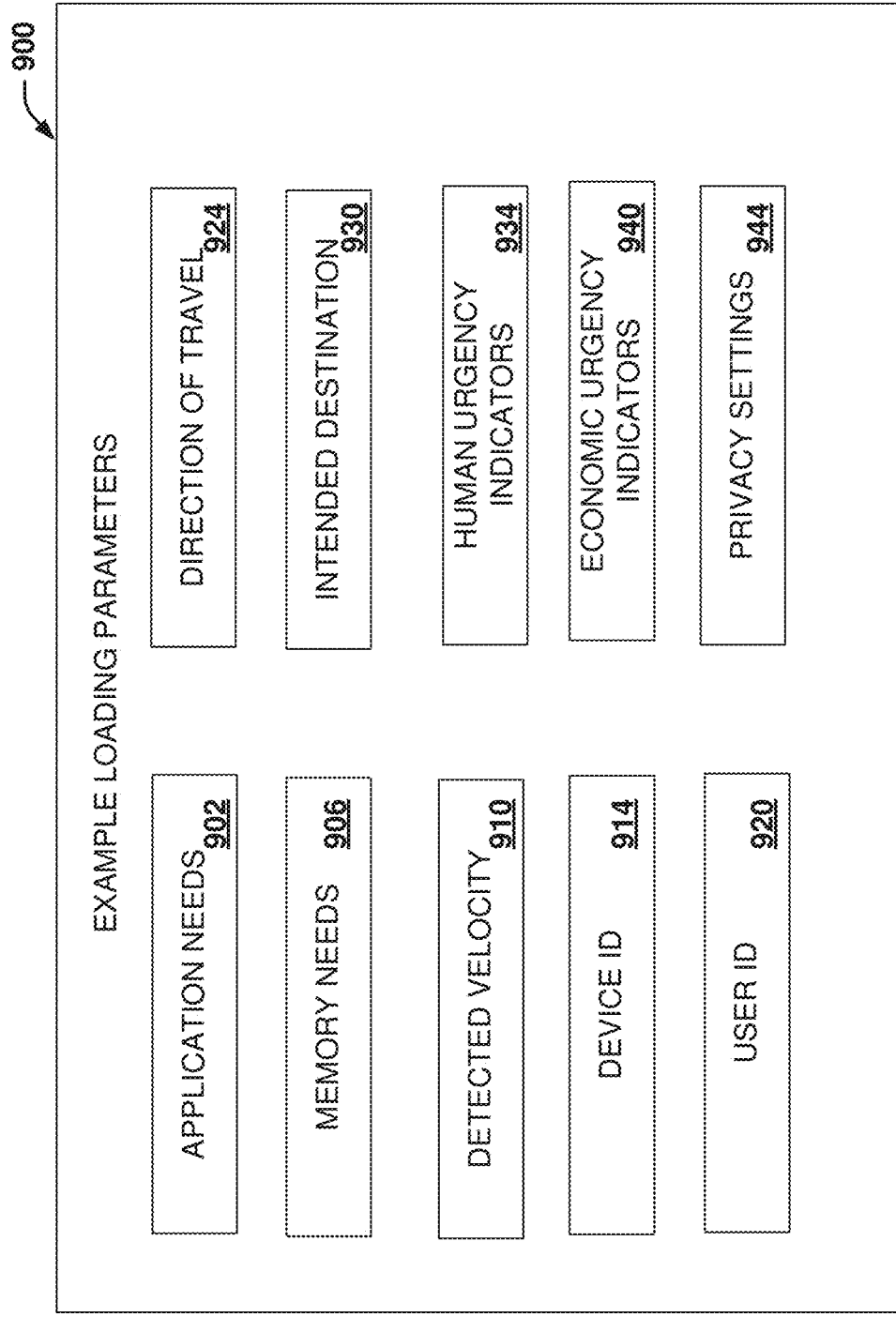
FIG. 9 illustrates example loading parameters to support device communications in view of uncertainty to facilitate communications in accordance with various aspects and embodiments of the subject disclosure.

FIG. 9 illustrates an example loading parameters file 900 to support device communications in view of uncertainty to facilitate communications in accordance with various aspects and embodiments of the subject disclosure. The loading parameters file 900 can include application demands parameter 902, which can include CPU and memory demands for the various applications operating on a given device. At 906, memory demands parameters relate to the memory resource allocation requests or demands to support communications with a given device. The loading parameters file 900 can include a detected velocity parameter 910 relating to the speed of travel of the mobile device which can be supplied by the device itself or via an application associated with the device. A device identification number 914 can be used to determine past usage requests or demands of a given device. A user identification number 920 can be employed to identify usage patterns associated with a given user of a device. A direction of travel parameter 924 can be used to determine potential next nodes of a mobile device destination path and can be provided from the device itself or an application associated with the device. An intended destination parameter 930 can be employed to determine next node resource requests or demands. Other parameters can include a number of device applications in use and/or device data to be communicated.

Human urgency parameters 934 can be employed to determine how urgent unexpected communications loads are to be handled. For very urgent calls (e.g., 911 type calls) maximum resources can be allocated to facilitate keeping the call alive at the determined next nodes in the chain. For less urgent calls, such as when a request to transfer a large data file has been encountered, the user can be queried whether the file can be transferred over a longer period of time to both reduce resource requests or requirements at the provider nodes and to mitigate costs for the user. Economic urgency parameters 940 indicate that some users may want maximum bandwidth capability for substantially all communications and other users are willing to have less resources allocated with the condition that larger files and/or unexpected loads will be transferred over longer periods of times and/or as other resources are freed up from handling more urgent tasks. At 944, privacy settings may be set by users where some users are willing to share more details of usage for an offer of lower rates whereas other users may prefer less device data being shared at the expense of higher service charges.

Figure 10:
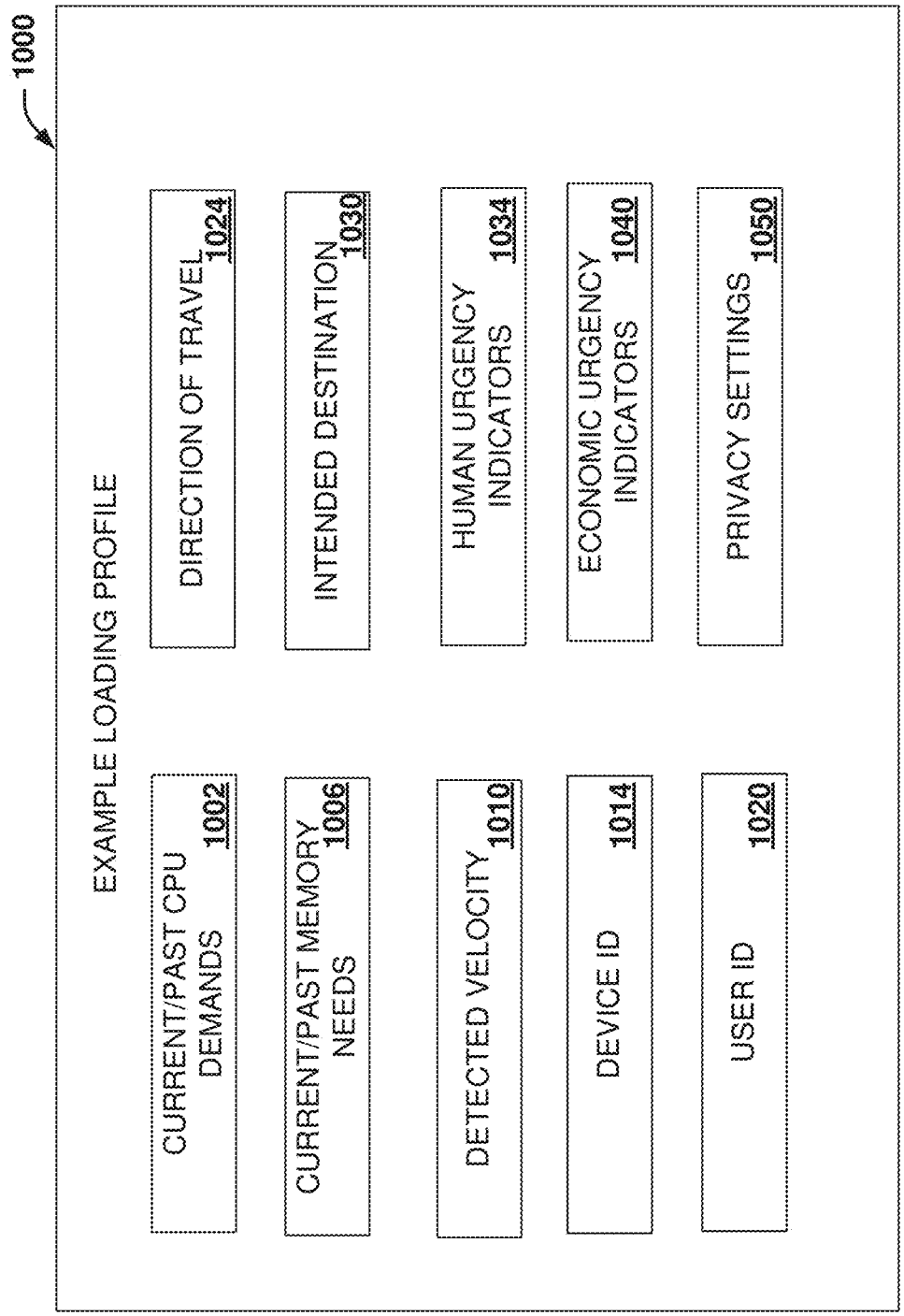
FIG. 10 illustrates an example loading profile to support device communications in view of uncertainty to facilitate communications in accordance with various aspects and embodiments of the subject disclosure.

FIG. 10 illustrates an example loading profile 1000 to support device communications in view of uncertainty to facilitate communications in accordance with various aspects and embodiments of the subject disclosure. In this example, the loading profile 1000 can include many of the loading parameters described above with respect to FIG. 9. Several of the loading profile parameters may be further processed by the uncertainty manager described herein to determine different likelihoods for communications loads to change and/or for routes to change which may indicate differing resource allocations between edge nodes. The loading profile 1000 may include current or past device processor demands at 1002 and current or past device memory demands at 1006. This may include detected velocity for the mobile device at 1010, the device identification number at 1014, and the user identification number at 1020. A direction of travel parameter may be processed at 1024 along with an intended destination parameter at 1030. An urgency indicator parameter 1034 an economic indicator parameter 1044, and/or privacy setting parameters may also be processed to determine potential communications loading requests or demands and/or mobile destination changes by the uncertainty manager described herein.

Figure 11:
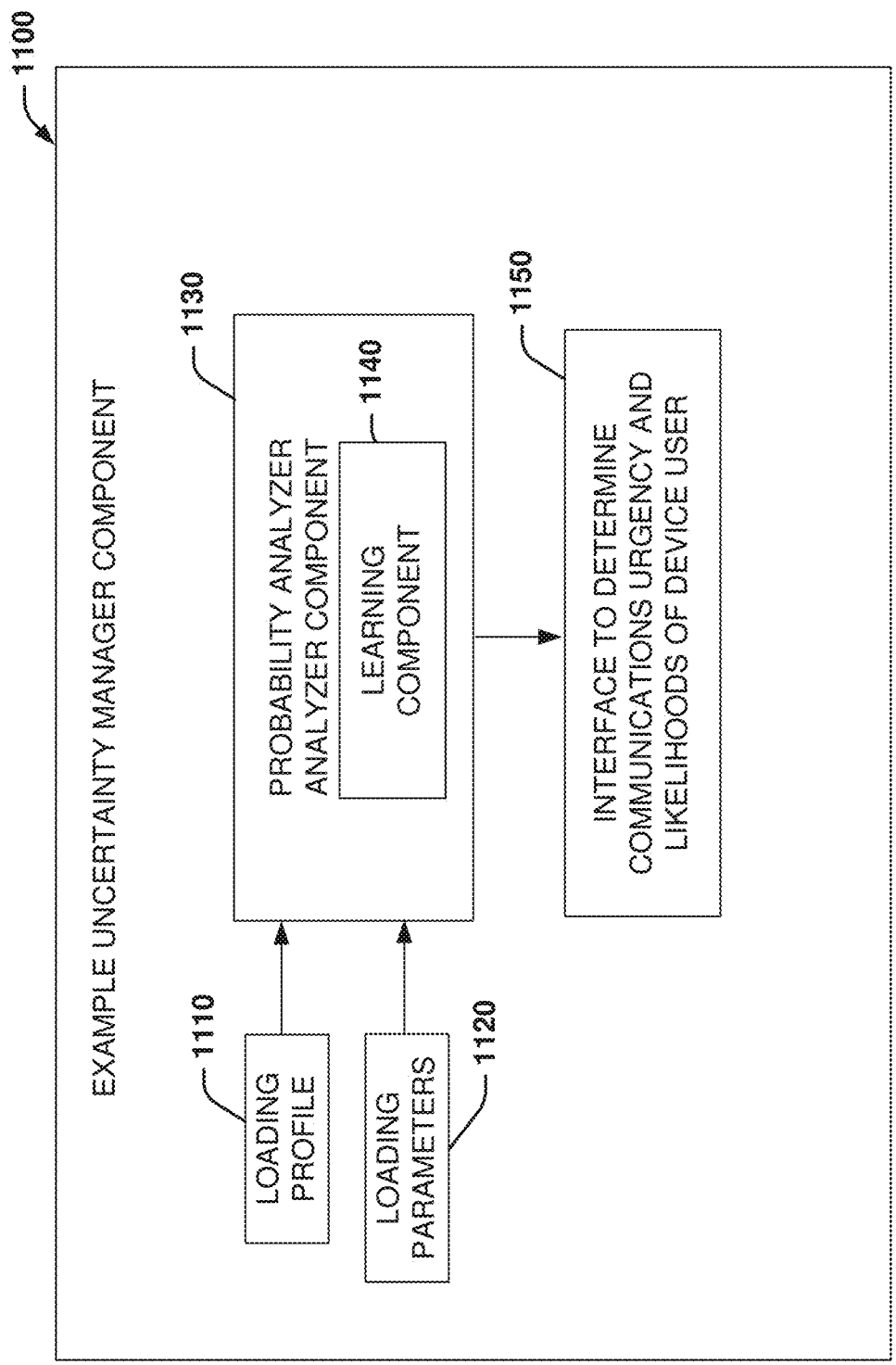
FIG. 11 illustrates an example uncertainty manager component to support device communications in view of uncertainty to facilitate communications in accordance with various aspects and embodiments of the subject disclosure.

FIG. 11 illustrates an example uncertainty manager component 1100 to support device communications in view of uncertainty to facilitate communications in accordance with various aspects and embodiments of the subject disclosure. As shown, a loading profile 1110 and/or loading parameters 1120 are processed by a probability analyzer component 1130 that determines the different likelihoods for uncertainty in route changes and/or communications loading requests or demands as described herein. Substantially any type of probabilistic analysis can occur including statistical models, mathematical models, inference models, and artificial intelligence models. As shown, a learning component 1140 may be employed to determine likelihoods for route changes and/or changes in communications loading requests or demands. The learning component 1140 can examine the entirety or a subset of the data from the respective profile or parameters to which it is granted access and can provide for reasoning about or infer states of the system, environment, and so forth from a set of observations as captured via events and/or data. An inference can be employed by the learning component 1140 to identify a specific context or action, or can generate a probability distribution (e.g., confidence) over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed by the learning component 1140 in connection with performing automatic and/or inferred action in connection with the claimed subject matter.

In one specific example, the learning component 1140 can include a classifier (or classifiers) that can map an input attribute vector, x=(x1, x2, x4, x4, xn), to a confidence that the input belongs to a class, such as by f(x)=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority. As shown, an interface component 1150 can be employed to receive an indication of urgency from a user operating the device. The indication of urgency can be employed to adjust the allocation of communications resources by respective CSP components. For example, on a 911 type call, the indication of urgency can be set at one of the highest possible levels for a system. For a less urgent call such as sending a large file that can be received at some later point in time, the interface 1150 can query the user (e.g., via voice message) to determine the urgency and can adjust resource allocations up or down based on the users response to the query (e.g., not urgent file transferred immediately, somewhat urgent file transferred as soon as possible, and so forth).

Figure 12:
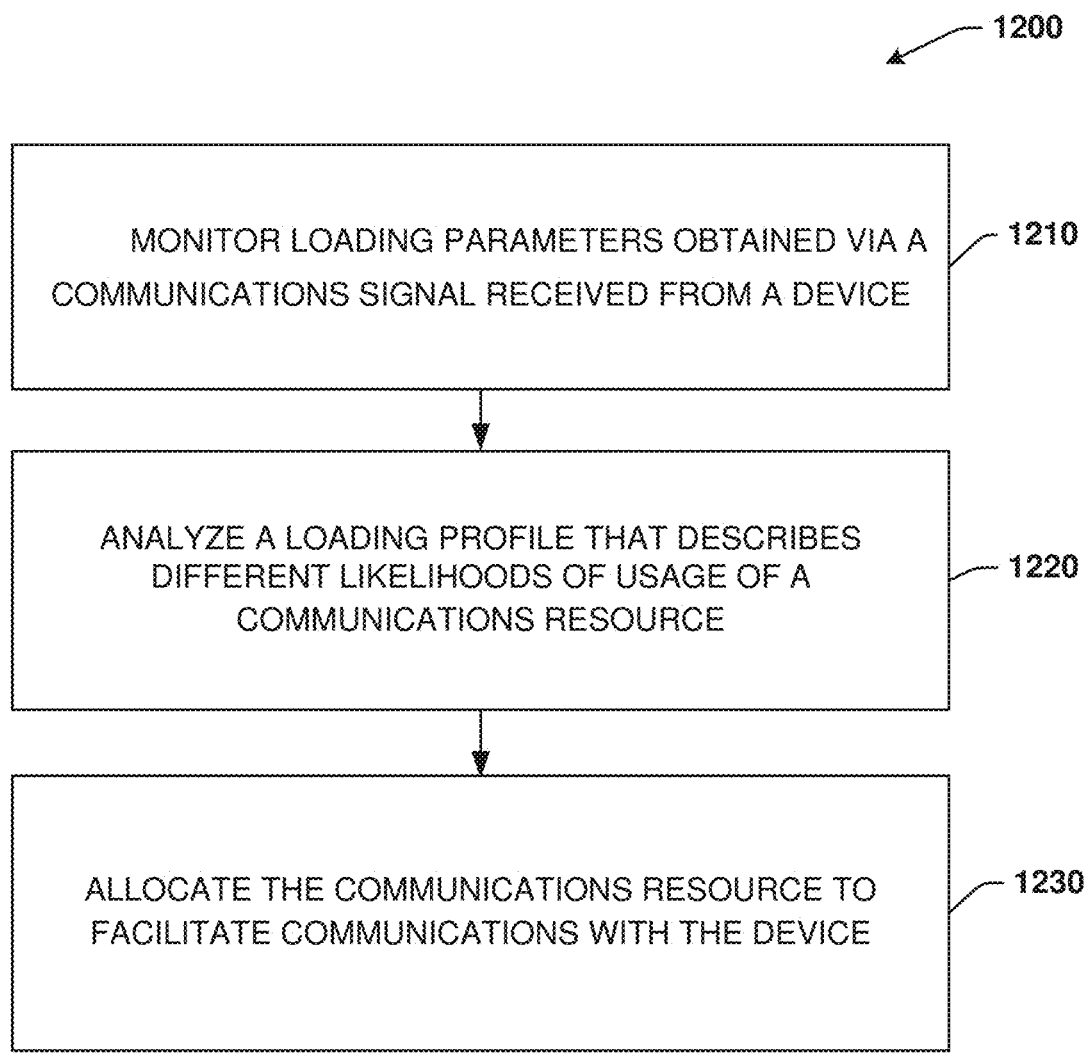
FIG. 12 illustrates an example flow diagram of a communication method that adaptively allocates communications resources in view of uncertainty to support device communications in accordance with various aspects and embodiments of the subject disclosure.

FIG. 12 illustrates an example flow diagram of a communication method 1200 that adaptively allocates communications resources in view of uncertainty to support device communications in accordance with various aspects and embodiments of the subject disclosure. At 1210, the method 1200 includes monitoring, by a first CSP component of a system comprising a processor, loading parameters obtained via a communications signal received from a device (e.g., via uncertainty manager component 134 of FIG. 1). At 1220, based on a probabilistic analysis of the loading parameters to determine a likelihood of mobility of the device, the method 1200 includes analyzing, by the first CSP component, a loading profile that describes different likelihoods of usage of a communications resource associated with the first CSP (e.g., via uncertainty manager component 134 of FIG. 1). At 1230, based on the loading parameters and the probabilistic analysis of the loading profile, the method 1200 includes allocating, by the first CSP component, the communications resource to facilitate communications with the device (e.g., via resource allocation component 144 of FIG. 1).

Although not shown, the method 1200 can also include electronically sharing the loading profile to at least a second CSP component associated with a second CSP to facilitate communications with the device based on a prediction of movement of the device determined from the loading parameters or the loading profile. The loading parameters can include a velocity parameter relating to the speed of travel of the mobile device, a device identification number, a user identification number, a direction of travel parameter, an intended destination parameter, a number of device applications in use, or device data to be communicated. The loading profile can include current or past device processor demands, current or past device memory demands, detected velocity, the device identification number, the user identification number, the direction of travel parameter, the intended destination parameter, an urgency indicator parameter, an economic indicator parameter, or privacy setting parameters. The method 1200 can also include receiving the communications signal from the device and determining communications resources to support communications with the device, wherein the communications resources can include data storage and processor utilization to support communications with the device.

Figure 13:
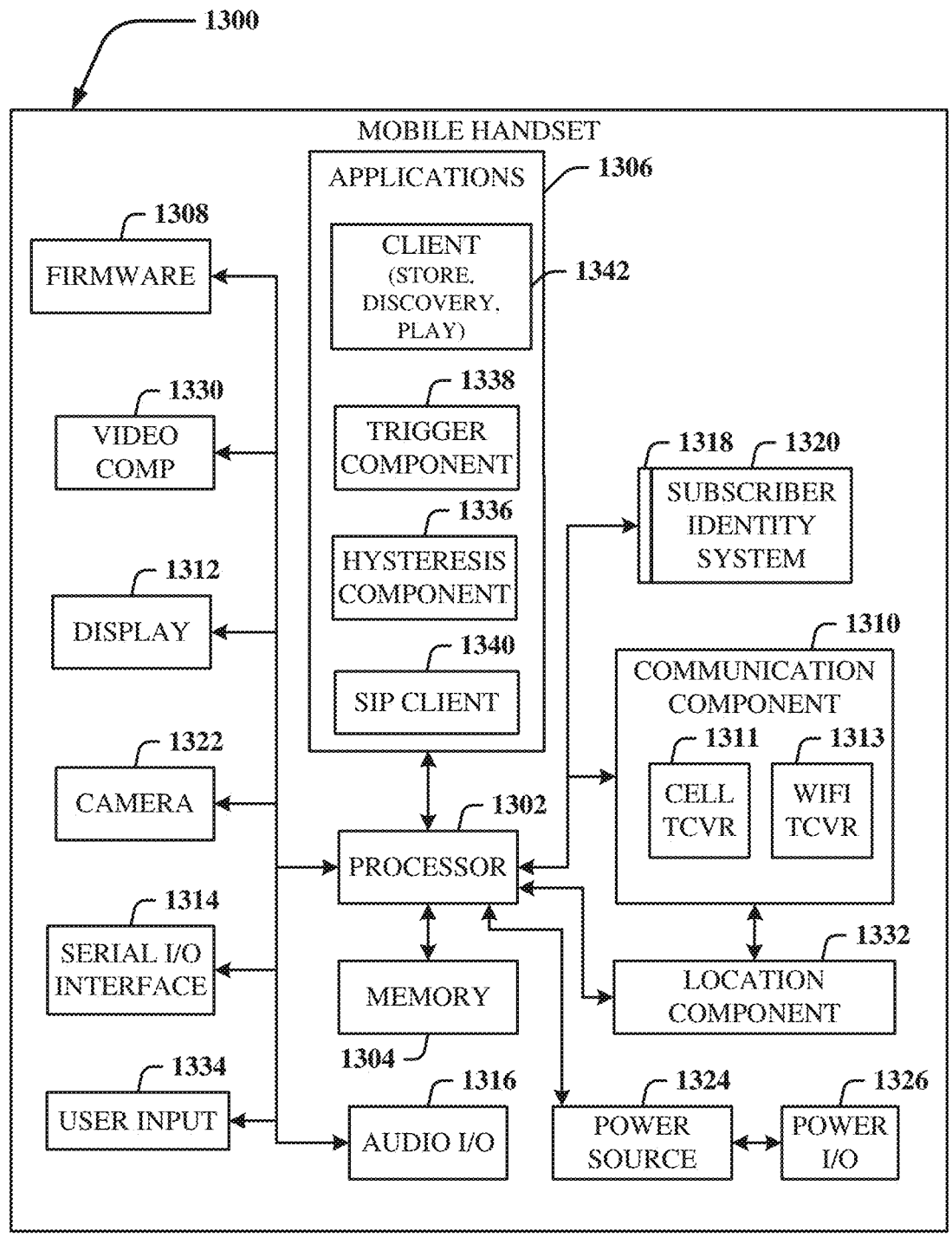
FIG. 13 illustrates an example block diagram of an example mobile handset operable to engage in a system architecture that facilitates wireless communications according to one or more embodiments described herein.

FIG. 13 illustrates an example block diagram of an example mobile handset 1300 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1300 includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308 and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1194) through a hard-wire connection, and other serial input devices (e.g., a keyboard, keypad, and mouse). This can support updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communications component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or decoded format.

A video processing component 1322 (e.g., a camera) can be provided for decoding encoded multimedia content. The video processing component 1322 can aid in facilitating the generation, editing, and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touchscreen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 1310, includes an indoor network radio transceiver 1313 (e.g., Wi-Fi transceiver). This function supports the indoor radio link, such as IEEE-802.11, for the dual-mode GSM handset 1300. The handset 1300 can accommodate at least satellite radio services through a handset that can combine wireless voice and digital radio chipsets into a single handheld device.

Figure 14:
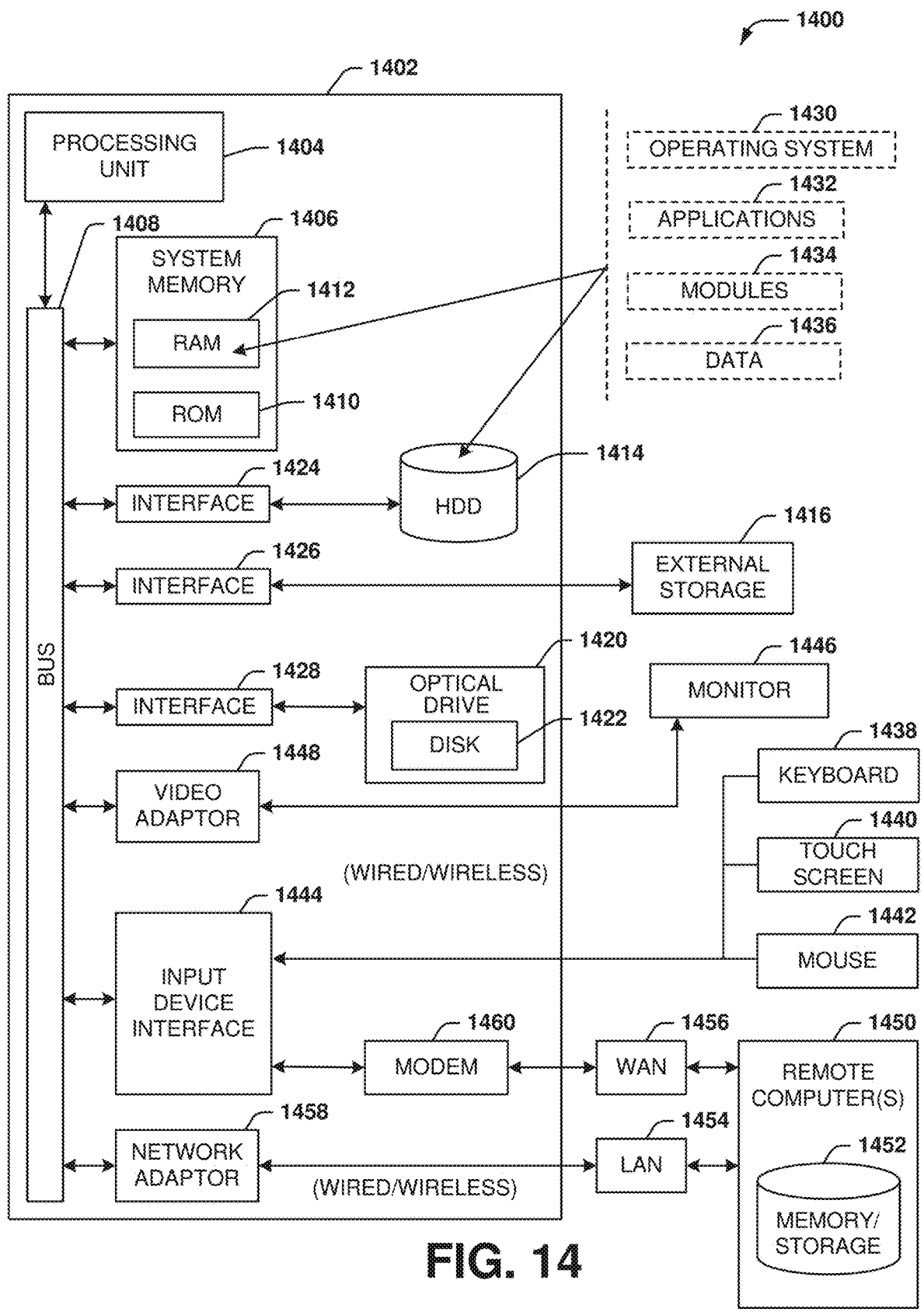
FIG. 14 illustrates an example block diagram of an example computer operable to engage in a system architecture that facilitates secure wireless communication according to one or more embodiments described herein.

FIG. 14 illustrates an example block diagram of an example computing environment 1400 operable to engage in a system architecture that facilitates secure wireless communication according to one or more embodiments described herein. The computing environment 1400 can provide networking and communication capabilities between a wired or wireless communication network and a server and/or communication device.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 operatively couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 15:
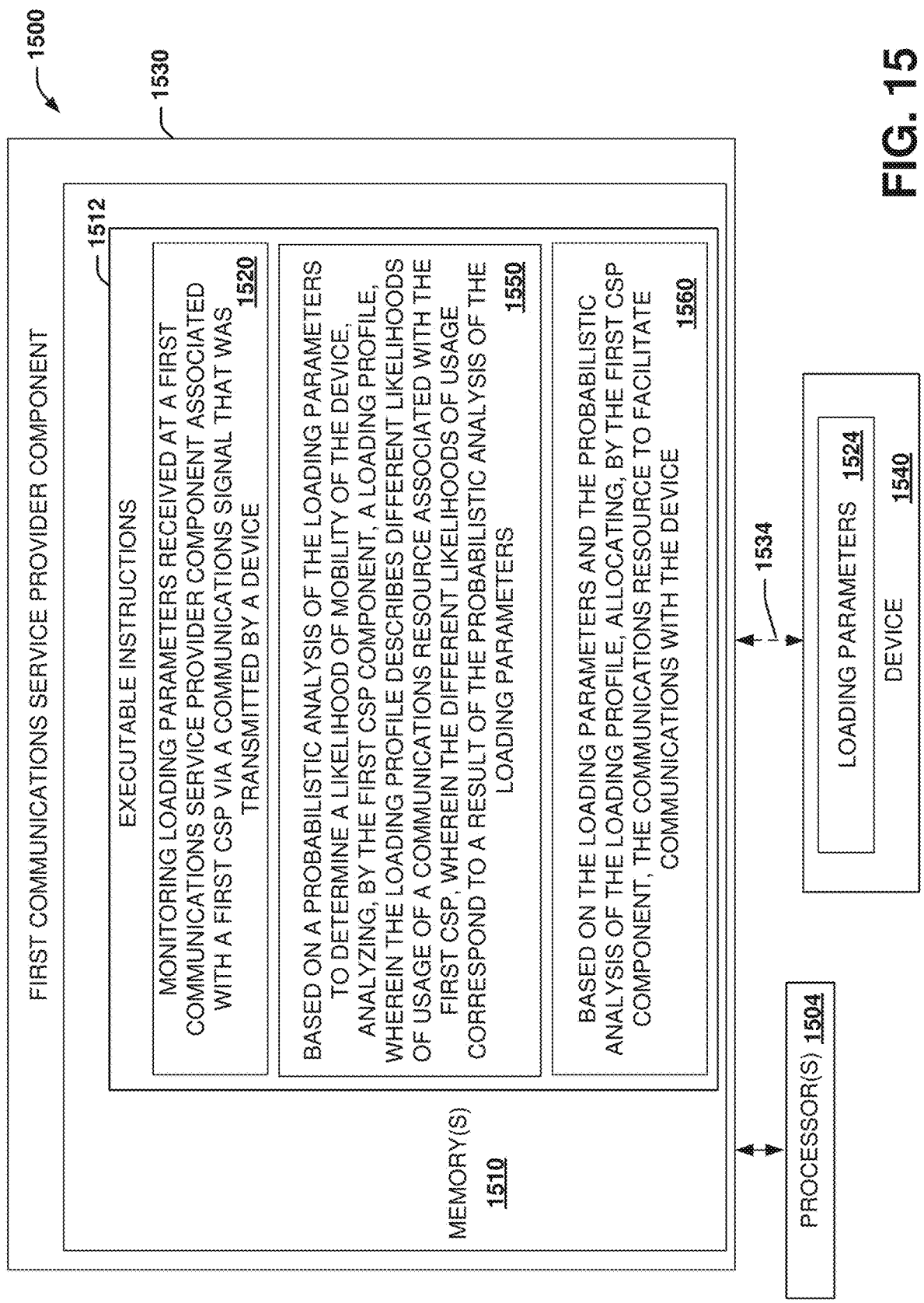
FIG. 15 illustrates an alternative example communication system that adaptively allocates communications resources to support device communications in accordance with various aspects and embodiments of the subject disclosure.

FIG. 15 illustrates an alternative example communication system 1500 that adaptively allocates communications resources to support device communications in accordance with various aspects and embodiments of the subject disclosure. The system 1500 includes a processor 1504 (or processors) and a memory 1510 (or memories) that stores executable instructions 1512 that, when executed by the processor, facilitate performance of operations. At 1520, the operations include monitoring loading parameters 1524 received at a first CSP component 1530 associated with a first CSP via a communications signal 1534 that was transmitted by a device 1540. Based on a probabilistic analysis of the loading parameters 1524 to determine a likelihood of mobility of the device 1540, the executable instructions at 1550 can include analyzing, by the first CSP component 1530, a loading profile (see e.g., 140 of FIG. 1), wherein the loading profile can describe different likelihoods of usage of a communications resource associated with the first CSP. The different likelihoods of usage can correspond to a result of the probabilistic analysis of the loading parameters 1524. Based on the loading parameters 1524 and the probabilistic analysis of the loading profile, the executable instructions at 1560 can include allocating, by the first CSP component 1530, the communications resource to facilitate device communications.

Figure 16:
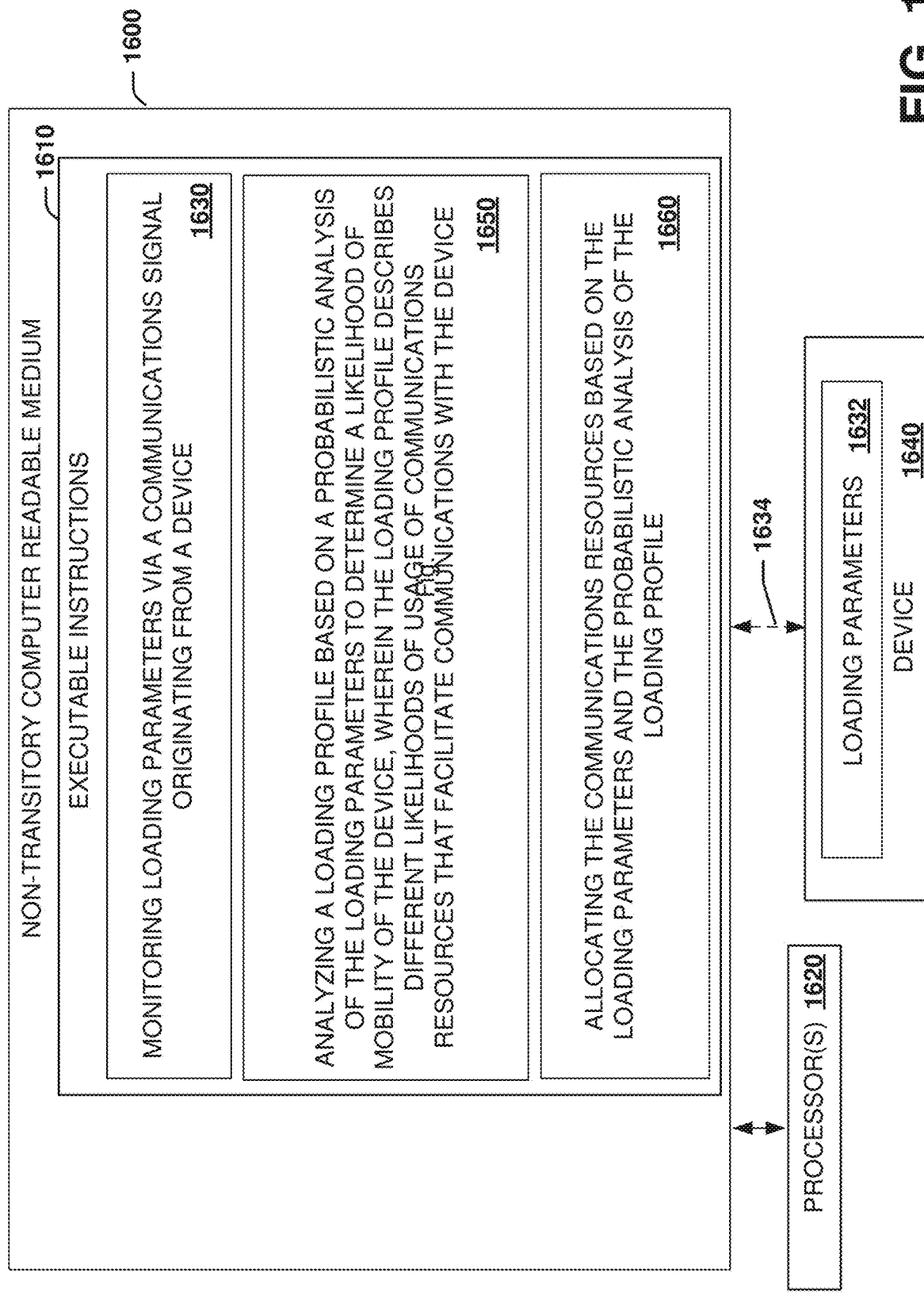
FIG. 16 illustrates an example non-transitory machine (or computer) readable medium executable on communication system that adaptively allocates communications resources to support device communications in accordance with various aspects and embodiments of the subject disclosure.

FIG. 16 illustrates an example non-transitory machine readable medium 1600 executable by a communication system that adaptively allocates communications resources to support device communications in accordance with various aspects and embodiments of the subject disclosure. The non-transitory machine-readable storage medium 1600 include executable instructions 1610 that, when executed by a processor 1620, facilitate performance of operations. At 1630, the executable instructions 1610 include monitoring loading parameters 1632 via a communications signal 1634 originating from a device 1640. At 1650, the executable instructions 1610 can include analyzing a loading profile based on a probabilistic analysis of the loading parameters to determine a likelihood of mobility of the device 1640, wherein the loading profile describes different likelihoods of usage of communications resources that facilitate communications with the device. At 1660, the executable instructions can include allocating the communications resources based on the loading parameters 1632 and the probabilistic analysis of the loading profile.

Figure 17:
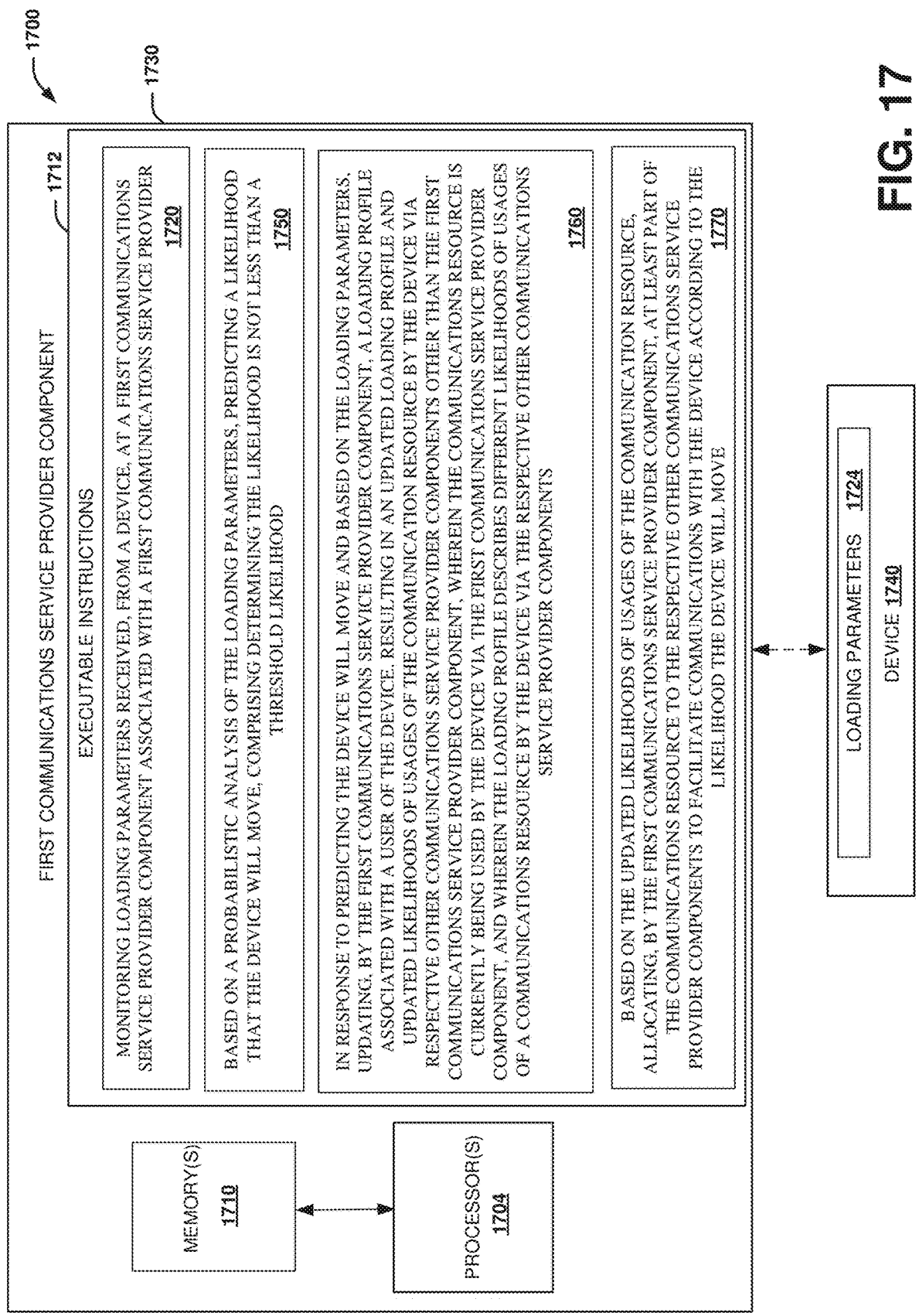
FIG. 17 illustrates another alternative example communication system that adaptively allocates communications resources to support device communications in accordance with various aspects and embodiments of the subject disclosure.

FIG. 17 illustrates another alternative example communication system that adaptively allocates communications resources to support device communications in accordance with various aspects and embodiments of the subject disclosure. The system 1700 includes a processor 1704 (or processors), local and/or remote to system 1700, and a memory 1710 (or memories), local and/or remote to system 1700. Memory 1710 stores executable instructions 1712 that, when executed by the processor 1704, facilitate performance of operations. At 1720, the operations include monitoring loading parameters 1724 received, from a device 1740, at a first communications service provider component 1730 associated with a first communications service provider. Next, at 1750, the operations can include, based on a probabilistic analysis of the loading parameters 1724, predicting a likelihood that the device 1740 will move, comprising determining the likelihood is not less than a threshold likelihood. Further, at 1760, the operations can include, in response to predicting the device 1740 will move and based on the loading parameters 1724, updating, by the first communications service provider component 1730, a loading profile (see e.g., 140 of FIG. 1) associated with a user of the device 1740, resulting in an updated loading profile and updated likelihoods of usages of the communication resource by the device 1740 via respective other communications service provider components other than the first communications service provider component 1730, wherein the communications resource is currently being used by the device 1740 via the first communications service provider component 1730, and wherein the loading profile describes different likelihoods of usages of a communications resource by the device 1740 via the respective other communications service provider components. The operations further include, as shown at 1770, based on the updated likelihoods of usages of the communication resource, allocating, by the first communications service provider component 1730, at least part of the communications resource to the respective other communications service provider components to facilitate communications with the device 1740 according to the likelihood the device 1740 will move.

The operations can further comprise sending the updated loading profile to at least a second communications service provider component associated with at least a second communications service provider to facilitate the communications with the device via at least the second communications service provider component according to the likelihood the device will move.

The loading parameters 1724 comprise at least one of a velocity parameter relating to a speed of travel of the mobile device, a device identification number, a user identification number, a direction of travel parameter, an intended destination parameter, a number of device applications in use, or device data to be communicated. The loading profile comprises at least one of current or past device processor demand, current or past device memory demand, a detected velocity of the device, a device identification number, a user identification number, a direction of travel parameter, an intended destination parameter, an urgency indicator parameter, an economic indicator parameter, or a privacy setting parameter.

The system 1700 can further include a first network access point that receives the loading parameters from the device and edge node equipment operatively coupled to network access points including the first network access point to perform the allocating of at least part of the communications resource to the respective other communications service provider components to facilitate the communications with the device according to the likelihood the device will move within communicative range of the respective other communications service provider components.

The system can further include edge node equipment, the device 1740 can be a first device, and the operations can further include detecting, by the edge node equipment, a second device other than the first device employable to supply at least part of the communications resource in support of the communications with the first device. In this regard, the operations can further comprise, in response to determining an approval has been received with respect to usage of the second device in support of the communications with the first device, facilitating, by the edge node equipment, supplying, by the second device, at least part of the communications resource in support of the communications with the first device.

The system can further include edge node equipment, the likelihood that the device will move can be the likelihood that the device will move within communicative range of the respective other communications service provider components, and the edge node equipment can record duration data representative of a duration of time during which the communications resource is provided to the device. Further, the duration data is shareable with the respective other communications service provider components to facilitate the communications with the device according to the likelihood that the device will move within communicative range of the respective other communications service provider components.

The system can further include edge node equipment, the edge node equipment can determine prediction data representative of a prediction that the device will exit a range of current edge node equipment supporting communications to subsequent edge node equipment based on a detected speed and direction of the device, and the subsequent edge node equipment can be determined from a network data store of identifiers for edge node equipment.

The system can further include edge node equipment, and the operations further comprise, based on an analysis of respective locations of the edge node equipment, assigning, to the edge node equipment, respective likelihoods that the device will move in range of the edge node equipment at the respective locations. In addition, allocating at least part of the communications resource to the respective other communications service provider components comprises allocating, by the edge node equipment based on the respective likelihoods, at least the part of the communication resource to the respective other communications service provider components.

The system can further include edge node equipment, and the operations further comprise releasing at least part of the communication resource allocated to the edge node equipment after the device has moved outside of a range supported by the edge node equipment.

The system can further include edge node equipment having respective loading profiles including the updated loading profile, and the operations further comprise aggregating the respective loading profiles from the edge node equipment into a collective loading profile usable to create a forecast for future likelihoods of usages of the communications resource by the device via the edge node equipment.

Optionally, the operations can further include receiving, via a user interface, an indication of urgency employed to adjust the allocating of at least part of the communications resource to the respective other communications service provider components consistent with a level of urgency represented by the indication of urgency.

Figure 18:
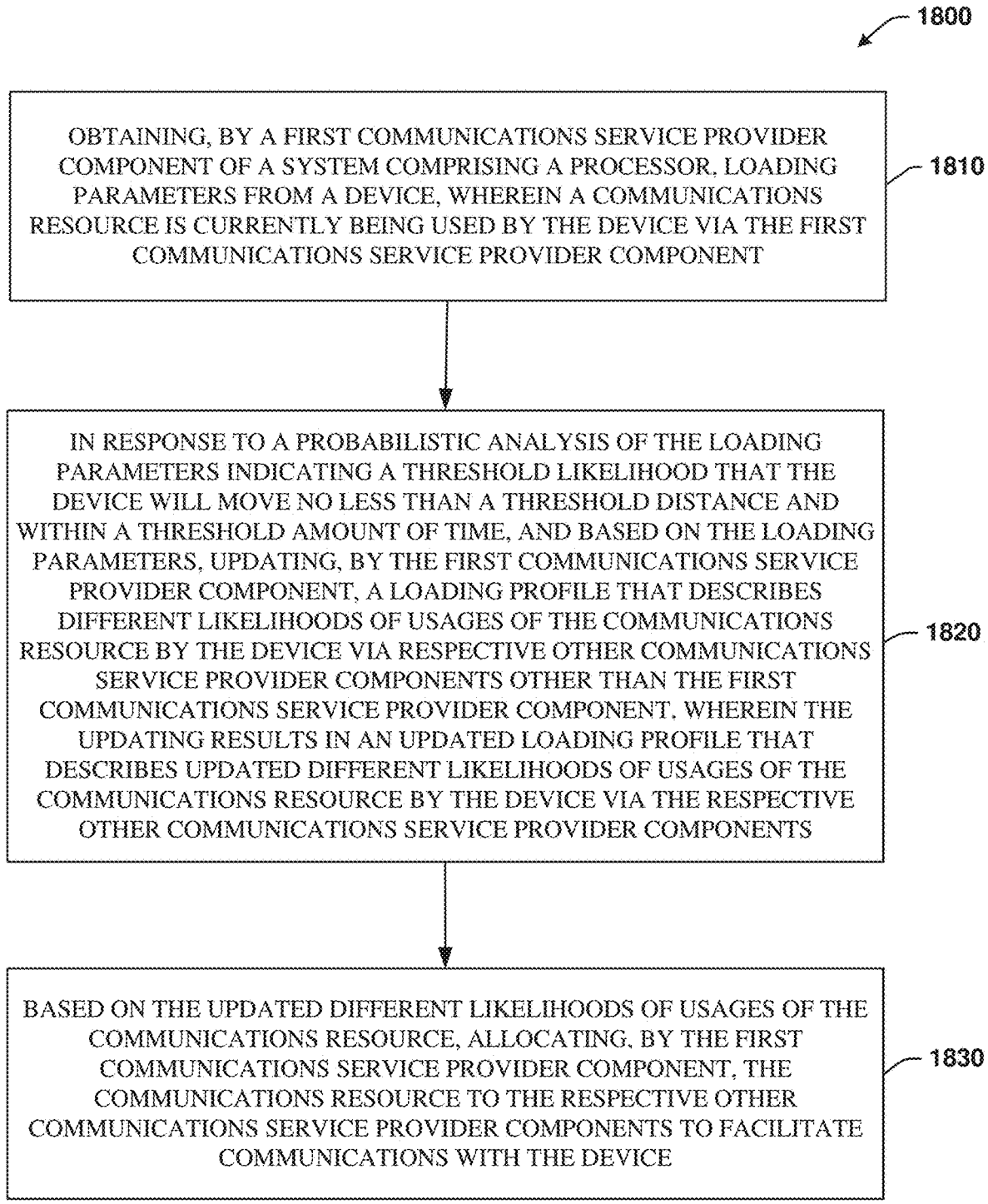
FIG. 18 illustrates another example flow diagram of a communication method that adaptively allocates communications resources in view of uncertainty to support device communications in accordance with various aspects and embodiments of the subject disclosure.

FIG. 18 illustrates another example flow diagram of a communication method that adaptively allocates communications resources in view of uncertainty to support device communications in accordance with various aspects and embodiments of the subject disclosure. FIG. 18 illustrates an example flow diagram of a communication method 1800 that adaptively allocates communications resources in view of uncertainty to support device communications in accordance with various aspects and embodiments of the subject disclosure. At 1810, the method 1800 includes obtaining, by a first communications service provider component of a system comprising a processor, loading parameters from a device, wherein a communications resource is currently being used by the device via the first communications service provider component. At 1820, the method 1800 includes, in response to a probabilistic analysis of the loading parameters indicating a threshold likelihood that the device will move no less than a threshold distance and within a threshold amount of time, and based on the loading parameters, updating, by the first communications service provider component, a loading profile that describes different likelihoods of usages of the communications resource by the device via respective other communications service provider components other than the first communications service provider component, wherein the updating results in an updated loading profile that describes updated different likelihoods of usages of the communications resource by the device via the respective other communications service provider components. At 1830, the method 1800 includes, based on the updated different likelihoods of usages of the communications resource, allocating, by the first communications service provider component, the communications resource to the respective other communications service provider components to facilitate communications with the device.

Although not shown, the method 1800 can also include, based on a prediction of movement, determined from the loading parameters, of the device to a location within communicative range of at least a second communications provider component of the respective other communications service provider components, sharing, by the first communications service provider component, the updated loading profile to at least the second communications service provider component to facilitate the communications with the device via at least the second communications provider component. Optionally, the communications resource can be a data storage resource and/or a processor utilization resource to support the communications with the device.

Figure 19:
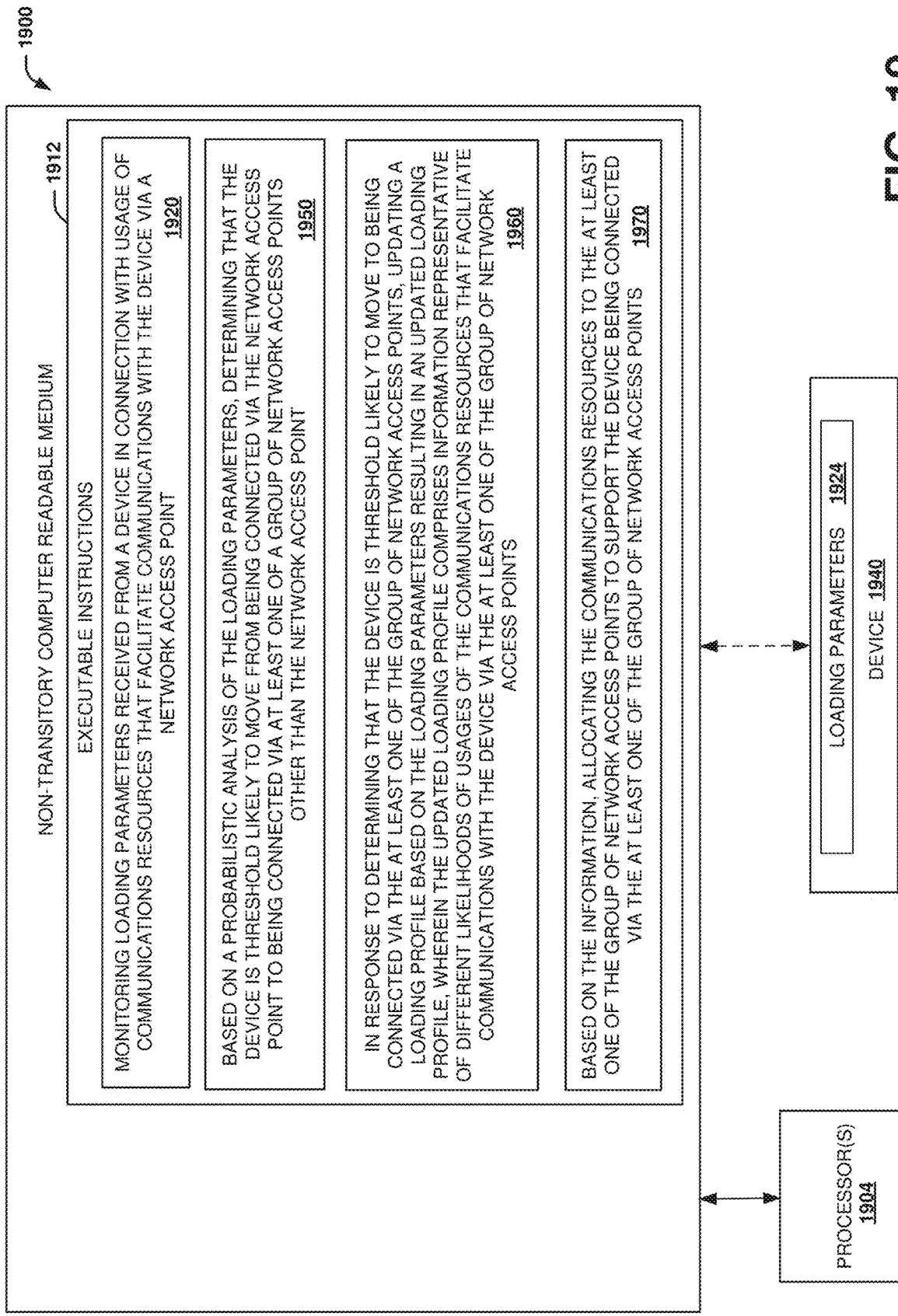
FIG. 19 illustrates another example non-transitory machine readable medium executable on communication system that adaptively allocates communications resources to support device communications in accordance with various aspects and embodiments of the subject disclosure.

FIG. 19 illustrates another example non-transitory machine readable medium 1900, executable by a communication system that adaptively allocates communications resources to support device communications in accordance with various aspects and embodiments of the subject disclosure. The non-transitory machine-readable storage medium 1900 includes executable instructions 1912 that, when executed by a processor 1904, facilitate performance of operations. At 1920, the operations include monitoring loading parameters 1924 received from a device 1940 in connection with usage of communications resources that facilitate communications with the device 1940 via a network access point. At 1950, the operations include monitoring loading parameters 1924 received from a device 1940. At 1950, the operations can include, based on a probabilistic analysis of the loading parameters, determining that the device is threshold likely to move from being connected via the network access point to being connected via at least one of a group of network access points other than the network access point.

At 1960, the operations can include, in response to determining that the device 1940 is threshold likely to move to being connected via the at least one of the group of network access points, updating a loading profile based on the loading parameters 1924 resulting in an updated loading profile, wherein the updated loading profile comprises information representative of different likelihoods of usages of the communications resources that facilitate communications with the device via the at least one of the group of network access points. At 1970, the operations can include, based on the information, allocating the communications resources to the at least one of the group of network access points to support the device being connected via the at least one of the group of network access points.

Optionally, determining that the device is threshold likely to move to being connected via the at least one of the group of network access points can include determining that the device is threshold likely to move within communicative range of the at least one of the group of network access points based on a prediction of a direction of movement and a distance of movement of the device determined from at least one of the loading parameters or the loading profile. In this regard, the operations can further comprise communicating the updated loading profile to the at least one of the group of network access points to facilitate further allocation of the communication resources by the at least one of the group of network access points in support of the communications with the device via the at least one of the group of network access points.

The above description of illustrated embodiments of the subject disclosure is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

As an overview, various embodiments are described herein to facilitate adaptive resource allocations. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long-Term Evolution (LTE), or other next generation networks, the disclosed aspects are not limited to 5G, a UMTS implementation, and/or an LTE implementation as the techniques can also be applied in 3G, 4G or other LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 902.XX technology. Additionally, substantially all aspects disclosed herein can be exploited in legacy telecommunication technologies.

Described herein are systems, methods, articles of manufacture, and other embodiments or implementations that can facilitate dynamic packet size adaptation to improve wireless network performance. Facilitating dynamic packet size adaptation to improve wireless network performance can be implemented in connection with any type of device with a connection to the communications network (e.g., a mobile handset, a computer, a handheld device, etc.) any Internet of Things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node device, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, evolved Node B (eNB or eNodeB), next generation Node B (gNB or gNodeB), network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller (e.g., controller, central controller, or centralized unit) that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

As an overview, described herein is the inter-dependency between cellular Radio Access Network (RAN) user-plane latency and Internet Protocol (IP) throughput for Transmission Control Protocol (TCP) based downloads utilizes IP packets for transmitting data. In some embodiments, a technique utilized for optimizing application throughput by improving TCP performance for cellular networks (both LTE and 5G) that involves monitoring the RAN conditions (e.g., round trip time (RTT) and signal strength) and dynamically adapting the packet size for a TCP connection to optimize its throughput. Under certain conditions, large packets are not always optimal for network performance, since they do not always yield high IP throughputs, due to their potentially-adverse impact on RAN latency. In many cases, smaller IP packet may yield lower RAN latency and subsequently, higher IP throughputs, under specific network conditions. Addressing the trade-offs between the choice of larger IP packets and smaller IP packets in network performance is relevant for both 4G and 5G systems.

For LTE, with fixed TTIs, the size of an IP packet for a UE determines its segmentation in the radio link control (RLC) layer. Segmentation of an IP packet results in multiple RLC PDUs, and the size of each RLC PDU is based on the instantaneous channel conditions of the UE (which impacts the SINR and modulation rate of the UE) and the cell load (which impacts the residual PRB s allocated to the UE). Each RLC PDU results in a MAC PDU that is transmitted to the UE, per TTI. For given UE channel and cell load conditions, a larger IP packet size results in a higher segmentation, and hence, higher TTIs to transmit the entire packet. This increases the downlink user-plane RAN latency of the packet. Upon receiving the entire packet, the UE sends a TCP ACK to the server in the uplink. Due to the higher RAN latency, the TCP RTT also becomes higher. This results in a very conservative increase in the TCP congestion window (cwnd). At times, there would be frequent dips in TCP cwnd due to potential TCP retransmission time-outs, caused by a higher RTT. Both these factors adversely impact the IP throughput. This limits LTE from optimally serving eMBB traffic (jointly with 5G) like AR/VR, HD live video, etc., which demand both high throughput and low latency.

For 5G, using a fixed packet size is also not the best choice. 5G NR supports the notion of flexible TTIs with shorter TTI durations. Shorter TTIs result in faster transmission of IP packets, resulting in smaller RTT values. This further causes the TCP cwnd to grow faster, quickly overcoming the TCP slow-start phase. This is again key to improving the performance of both eMBB and uRLLC applications. Too large a packet size for the instantaneous RAN conditions might significantly limit the network and the application from fully utilizing the benefits offered by flexible TTI design in NR. The gains offered by shorter TTIs may be marred by higher segmentation of the IP packet, in the case of a larger packet size. In some embodiments, a RAN-assisted online IP packet size guidance system that can be used to select the optimal TCP Maximum Segment Size (which determines the resulting IP packet size) for each TCP flow can be utilized improve performance. Described herein is a system and method to dynamically adapt the maximum transmission unit (MSS)/maximum TCP segment size (MTU) to dynamically control the RTT and therefore, the application throughput. In some embodiments, the method comprises (i) monitoring the RTT and the TCP behavior/TCP throughput over time, (ii) signal strength (iii) cell load, and through artificial intelligence adapting the MTU/MSS. For example, for a flow, the system can assign an MSS at the beginning of the flow and use it through the flow. For another flow, the system can dynamically adapt the MSS within a flow.

In some embodiments, reducing the IP packet size may cause loss in IP throughput. To compensate for the loss, the RTT may be reduced. Reduction in RTT causes quicker growth in TCP congestion window and gains in IP throughput. When there is RLC PDU segmentation, an IP packet undergoes higher RAN latency and hence, higher TCP RTT. Reducing IP packet size reduces RLC PDU segmentation, reducing TCP RTT thereby causing a growth in TCP cwnd. An ideal packet size is one where the loss in packet size is less than the gain in the growth of TCP cwnd, translating to increased IP throughput. Thus, the optimal IP packet size is a function of the instantaneous RLC PDU size.

The MTU/MSS size can the resulting IP packet size and the TCP segment size (excluding the IP header). These parameters are configured at the TCP server that generates the IP packets using iPerf3 data streaming. The MTU/MSS size can be configured ranging from 250 bytes to 1500 bytes, to generate IP packets of different sizes. According to an embodiment, the system and method comprises 1. Monitoring the RTT and signal strength by the application, 2. Dynamically adjusting the TCP MSS/MTU, based on the observed RTT and signal strength, so as to optimize its future performance and hence, the overall flow throughput. Using shorter packets (coming from smaller MSS/MTUs) yields higher throughputs, especially in scenarios where the RAN latency is high due to poor RF or loaded cells or both.

This trade-off is due to the impact of RAN latency. Higher MTU yielding a larger packet size causes a higher RAN latency, which results in a higher TCP RTT. This further results in a very conservative increase or frequent dips in TCP congestion window, which adversely impacts IP throughput. Smaller MTUs yield lower RAN latency, in challenging RF/load scenarios, resulting in lower TCP RTT, causing a more aggressive increase in TCP congestion window, which further increases IP throughput.

According to some embodiments, in order to determine the optimal packet size, RAN assisted TCP MTU optimization is performed at the core network. For example, identify key RAN parameters (e.g., KPIs) affecting TCP performance, which may include, but not limited to, RSRP, user load, PDCP PDU size. Note that the PDCP PDU size results from the configured MTU/MSS size. The key RAN parameters can be determined during the flow or can be retrieved from a database.

For each RAN condition corresponding to a given combination of experimental parameters categorized as {high, medium, low} (e.g., RSRP, user load, PDCP PDU size), create a profile of the TCP RTT, congestion window and the overall flow performance in terms of its IP throughput. In some embodiments, the profile can be created based on historical data. In some embodiments, the profile can be created online based on real-time RAN feed, generating the above RAN key performance indicators (KPIs).

Determine the TCP MSS/MTU parameter setting that is optimal for each categorized RAN setting, yielding the maximum IP throughput for that setting. In one embodiment, this determination of TCP parameter setting could be done based on historical data. In another embodiment, this determination of optimal TCP parameter setting could be done online based on real-time RAN feed, generating the above RAN KPIs. In another embodiment, determination can be done based on historical data and/or done online based on real-time RAN feed, generating the above RAN KPIs.

Create a table mapping each RAN setting to the corresponding optimal TCP MSS/MTU parameter setting and at run time, based on predicted RAN conditions, use the table to determine the corresponding optimal TCP MSS/MTU parameter setting.

In some embodiments, a system integrating MTU adaptation guidance analytics (based on RAN/TCP latencies) as a micro-service to optimize MTU or IP packet sizes for TCP-based data streaming at the core network, or in application design is disclosed herein. The Data Collection, Analytics, and Events (DCAE) subsystem receive the RAN KPIs from the real-time feed generated from eNBs deployed network operator. The micro-services module running in DCAE can publish real-time RAN/TCP latency and optimal MTU size prediction results using our model. The server can provide MTU adaptation results to subscribers. The subscribers can include the Multi-Server Proxy (MSP) in the core network or the application which streams payload to the UE. MTU guidance to MSP is regarded as a closed-loop guidance system, where the prediction results are being fed back to the network, to improve operations. If MTU guidance is provided to a third-party application, it is regarded as a case of open-loop guidance, since the application can use this guidance in optimizing content delivery of a third-party app.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the description is not to be limited to any single implementation, but rather is to be construed in breadth, spirit and scope in accordance with the appended claims.

What is claimed is:

1. A system, comprising:
a processor; and
a memory that stores executable instructions that, when executed by the processor, facilitate performance of operations, comprising:
monitoring loading parameters received, from a device, at a first communications service provider component associated with a first communications service provider;
based on a probabilistic analysis of the loading parameters, predicting a likelihood that the device will move, comprising determining the likelihood is not less than a threshold likelihood;
in response to predicting the device will move and based on the loading parameters, updating, by the first communications service provider component, a loading profile associated with a user of the device, resulting in an updated loading profile and updated likelihoods of usages of the communication resource by the device via respective other communications service provider components other than the first communications service provider component, wherein the communications resource is currently being used by the device via the first communications service provider component, and wherein the loading profile describes different likelihoods of usages of a communications resource by the device via the respective other communications service provider components; and
based on the updated likelihoods of usages of the communication resource, allocating, by the first communications service provider component, at least part of the communications resource to the respective other communications service provider components to facilitate communications with the device according to the likelihood the device will move.

2. The system of claim 1, wherein the operations further comprise sending the updated loading profile to at least a second communications service provider component associated with at least a second communications service provider to facilitate the communications with the device via at least the second communications service provider component according to the likelihood the device will move.

3. The system of claim 1, wherein the loading parameters comprise at least one of a velocity parameter relating to a speed of travel of the mobile device, a device identification number, a user identification number, a direction of travel parameter, an intended destination parameter, a number of device applications in use, or device data to be communicated.

4. The system of claim 1, wherein the loading profile comprises at least one of current or past device processor demand, current or past device memory demand, a detected velocity of the device, a device identification number, a user identification number, a direction of travel parameter, an intended destination parameter, an urgency indicator parameter, an economic indicator parameter, or a privacy setting parameter.

5. The system of claim 1, further comprising a first network access point that receives the loading parameters from the device and edge node equipment operatively coupled to network access points including the first network access point to perform the allocating of at least part of the communications resource to the respective other communications service provider components to facilitate the communications with the device according to the likelihood the device will move within communicative range of the respective other communications service provider components.

6. The system of claim 1, further comprising edge node equipment, wherein the device is a first device, and wherein the operations further comprise:
detecting, by the edge node equipment, a second device other than the first device employable to supply at least part of the communications resource in support of the communications with the first device.

7. The system of claim 6, wherein the operations further comprise:
in response to determining an approval has been received with respect to usage of the second device in support of the communications with the first device, facilitating, by the edge node equipment, supplying, by the second device, at least part of the communications resource in support of the communications with the first device.

8. The system of claim 1, further comprising edge node equipment, wherein the likelihood that the device will move is the likelihood that the device will move within communicative range of the respective other communications service provider components, wherein the edge node equipment records duration data representative of a duration of time during which the communications resource is provided to the device, and wherein the duration data is shareable with the respective other communications service provider components to facilitate the communications with the device according to the likelihood that the device will move within communicative range of the respective other communications service provider components.

9. The system of claim 1, further comprising edge node equipment, wherein the edge node equipment determines prediction data representative of a prediction that the device will exit a range of current edge node equipment supporting communications to subsequent edge node equipment based on a detected speed and direction of the device, and wherein the subsequent edge node equipment is determined from a network data store of identifiers for edge node equipment.

10. The system of claim 1, further comprising edge node equipment, wherein the operations further comprise:
based on an analysis of respective locations of the edge node equipment, assigning, to the edge node equipment, respective likelihoods that the device will move in range of the edge node equipment at the respective locations,
wherein allocating at least part of the communications resource to the respective other communications service provider components comprises allocating, by the edge node equipment based on the respective likelihoods, at least the part of the communication resource to the respective other communications service provider components.

11. The system of claim 1, further comprising edge node equipment, and wherein the operations further comprise:
releasing at least part of the communication resource allocated to the edge node equipment after the device has moved outside of a range supported by the edge node equipment.

12. The system of claim 1, further comprising edge node equipment having respective loading profiles including the updated loading profile, wherein the operations further comprise:
aggregating the respective loading profiles from the edge node equipment into a collective loading profile usable to create a forecast for future likelihoods of usages of the communications resource by the device via the edge node equipment.

13. The system of claim 1, wherein the operations further comprise receiving, via a user interface, an indication of urgency employed to adjust the allocating of at least part of the communications resource to the respective other communications service provider components consistent with a level of urgency represented by the indication of urgency.

14. A method, comprising:
obtaining, by a first communications service provider component of a system comprising a processor, loading parameters from a device, wherein a communications resource is currently being used by the device via the first communications service provider component;
in response to a probabilistic analysis of the loading parameters indicating a threshold likelihood that the device will move no less than a threshold distance and within a threshold amount of time, and based on the loading parameters, updating, by the first communications service provider component, a loading profile that describes different likelihoods of usages of the communications resource by the device via respective other communications service provider components other than the first communications service provider component, wherein the updating results in an updated loading profile that describes updated different likelihoods of usages of the communications resource by the device via the respective other communications service provider components; and
based on the updated different likelihoods of usages of the communications resource, allocating, by the first communications service provider component, the communications resource to the respective other communications service provider components to facilitate communications with the device.

15. The method of claim 14, further comprising
based on a prediction of movement, determined from the loading parameters, of the device to a location within communicative range of at least a second communications provider component of the respective other communications service provider components, sharing, by the first communications service provider component, the updated loading profile to at least the second communications service provider component to facilitate the communications with the device via at least the second communications provider component.

16. The method of claim 14, wherein the loading parameters comprise at least one of a velocity parameter relating to a speed of travel of the mobile device, a device identification number, a user identification number, a direction of travel parameter, an intended destination parameter, a number of device applications in use, or device data to be communicated.

17. The method of claim 14, wherein the updated loading profile comprises at least one of current or past device processor demand, current or past device memory demand, a detected velocity, a device identification number, a user identification number, a direction of travel parameter, an intended destination parameter, an urgency indicator parameter, an economic indicator parameter, or a privacy setting parameter.

18. The method of claim 14, wherein the communications resource comprises at least one of a data storage resource or a processor utilization resource to support the communications with the device.

19. A non-transitory machine-readable medium, comprising executable instructions that, when executed by a processor, facilitate performance of operations, comprising:
monitoring loading parameters received from a device in connection with usage of communications resources that facilitate communications with the device via a network access point;
based on a probabilistic analysis of the loading parameters, determining that the device is threshold likely to move from being connected via the network access point to being connected via at least one of a group of network access points other than the network access point;
in response to determining that the device is threshold likely to move to being connected via the at least one of the group of network access points, updating a loading profile based on the loading parameters resulting in an updated loading profile, wherein the updated loading profile comprises information representative of different likelihoods of usages of the communications resources that facilitate communications with the device via the at least one of the group of network access points; and
based on the information, allocating the communications resources to the at least one of the group of network access points to support the device being connected via the at least one of the group of network access points.

20. The non-transitory machine-readable medium of claim 19, wherein determining that the device is threshold likely to move to being connected via the at least one of the group of network access points comprises determining that the device is threshold likely to move within communicative range of the at least one of the group of network access points based on a prediction of a direction of movement and a distance of movement of the device determined from at least one of the loading parameters or the loading profile, and
wherein the operations further comprise communicating the updated loading profile to the at least one of the group of network access points to facilitate further allocation of the communication resources by the at least one of the group of network access points in support of the communications with the device via the at least one of the group of network access points.

* * * * *